(12) United States Patent
Park et al.

(10) Patent No.: US 10,285,557 B2
(45) Date of Patent: May 14, 2019

(54) CLEANING ROBOT AND CONTROL METHOD THEREOF

(71) Applicant: SAMSUNG ELECTRONICS CO., LTD., Suwon-si, Gyeonggi-do (KR)

(72) Inventors: Young Jae Park, Suwon-si (KR); Won Kuk Kim, Seoul (KR); Hyo Won Sin, Anseong-si (KR); Jae Hwi Jang, Yongin-si (KR); Sin Ae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 537 days.

(21) Appl. No.: 14/337,482

(22) Filed: Jul. 22, 2014

(65) Prior Publication Data
US 2015/0150428 A1    Jun. 4, 2015

(30) Foreign Application Priority Data

Nov. 29, 2013 (KR) .......................... 10-2013-014929

(51) Int. Cl.
*A47L 11/40* (2006.01)
*A47L 11/283* (2006.01)
*G05D 1/02* (2006.01)

(52) U.S. Cl.
CPC ......... *A47L 11/4011* (2013.01); *A47L 11/283* (2013.01); *A47L 11/4005* (2013.01);
(Continued)

(58) Field of Classification Search
CPC ............. A47L 2201/06; A47L 11/4011; A47L 2201/04
See application file for complete search history.

(56) References Cited

U.S. PATENT DOCUMENTS 6,956,348 B2 * 10/2005 Landry ................. A47L 9/2805
15/319
7,053,580 B2 *  5/2006 Aldred .................... A47L 9/009
318/580
(Continued)

FOREIGN PATENT DOCUMENTS

JP       2000-39917       2/2000
JP       2003-339599     12/2003
KR    10-2006-0097265     9/2006

OTHER PUBLICATIONS

European Search Report dated Apr. 29, 2015 in corresponding European Patent Application No. 14186687.1.

(Continued)

*Primary Examiner* — Bryan R Muller
(74) *Attorney, Agent, or Firm* — Staas & Halsey LLP

(57) ABSTRACT

A cleaning robot and a control method thereof may improve power consumption efficiency by using low-voltage power for a moving or inspecting operation and performing the moving or inspecting operation while operation of the cleaning unit is stopped when the operation of the cleaning unit is not needed. The cleaning robot includes a battery, a moving unit, a cleaning unit, a power converter which converts and outputs power supplied from the battery into a first voltage driving the moving unit and a second voltage driving the cleaning unit, and a controller which supplies power having the first voltage to the moving unit so as to drive the moving unit and supplies power having the second voltage to the cleaning unit so as to perform a cleaning operation. The controller continues driving the moving unit but stops driving the cleaning unit when the cleaning robot moves on an already cleaned area.

10 Claims, 21 Drawing Sheets

(52) U.S. Cl.
CPC ....... *A47L 11/4008* (2013.01); *A47L 11/4066* (2013.01); *G05D 1/0219* (2013.01); *G05D 1/0274* (2013.01); *A47L 2201/022* (2013.01); *A47L 2201/04* (2013.01); *A47L 2201/06* (2013.01); *G05D 1/0225* (2013.01); *G05D 1/0246* (2013.01); *G05D 2201/0203* (2013.01)

(56) References Cited

U.S. PATENT DOCUMENTS

| | | | |
|---|---|---|---|
| 7,113,847 B2 * | 9/2006 | Chmura | A47L 5/36 |
| | | | 318/568.1 |
| 7,133,746 B2 | 11/2006 | Abramson et al. | |
| 2005/0273967 A1 * | 12/2005 | Taylor | A47L 5/28 |
| | | | 15/319 |
| 2013/0098402 A1 | 4/2013 | Yoon et al. | |
| 2013/0118528 A1 | 5/2013 | Kim et al. | |
| 2014/0166047 A1 * | 6/2014 | Hillen | A47L 9/30 |
| | | | 134/6 |

OTHER PUBLICATIONS

European Communication dated Oct. 4, 2018 in European Patent Application No. 14186687.1.

* cited by examiner

CLEANING ROBOT AND CONTROL METHOD THEREOF

CROSS-REFERENCE TO RELATED APPLICATIONS

This application claims the benefit of Korean Patent Application No. 10-2013-0146929, filed on Nov. 29, 2013 in the Korean Intellectual Property Office, the disclosure of which is incorporated herein by reference.

BACKGROUND

1. Field

One or more embodiments relate to a cleaning robot, and more particularly, to a cleaning robot which automatically inspects a given area to be cleaned, generates a route, and performs a cleaning operation while driving along the generated route.

2. Description of the Related Art

A cleaning robot has to perform moving, inspecting, and cleaning operations while moving on a given area to be cleaned. If the cleaning robot receives power through a wire, it is difficult to freely move on the area to be cleaned. Therefore, the cleaning robot may receive the power through a battery, and it is able to freely move on the area to be cleaned.

When the cleaning robot receives high-voltage AC power through the wire, it is possible to provide a high sucking force of a cleaning unit, even though a degree of moving freedom thereof is lowered. However, when the cleaning robot receives the power through the battery, it is limited in power use due to a limitation of a battery size, even though the degree of moving freedom thereof is improved. For example, when it is necessary to generate a high output, power consumption of the battery is increased, and thus it is difficult to perform the cleaning operation over a long time. On the contrary to this, when it is necessary to enable the cleaning operation to be performed for a long time, the generation of the high sucking force should be restrained, and low power consumption is required.

SUMMARY

The foregoing described problems may be overcome and/or other aspects may be achieved by one or more embodiments of a cleaning robot and a control method thereof, which may enhance cleaning efficiency by using a high-voltage power upon an operation of a cleaning unit, and also may improve power consumption efficiency by using a low-voltage power upon a moving or inspecting operation.

The foregoing described problems may be overcome and/or other aspects may be achieved by one or more embodiments of a cleaning robot and a control method thereof, which may perform the moving or inspecting operation while the operation of the cleaning unit is stopped in a case in which the operation of the cleaning unit is not needed, and thus may enhance the power consumption efficiency.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

In accordance with one or more embodiments, a cleaning robot may include a battery, a moving unit, a cleaning unit, a power converting unit (i.e., a power converter) which may convert and outputs power supplied from the battery into a first voltage driving the moving unit and a second voltage driving the cleaning unit, and a control unit (i.e., a controller) which may supply power having the first voltage to the moving unit so as to drive the moving unit and may supply power having the second voltage to the cleaning unit so as to perform a cleaning operation, wherein the control unit changes power supply to the cleaning unit according to at least one of a cleaning state and an operation mode.

The control unit may interrupt the power supply from the power converting unit to the cleaning unit, when the cleaning robot moves on an already cleaned area of the cleaning area.

The control unit may interrupt the power supply to the cleaning unit, when a moving distance on the already cleaned area exceeds a reference distance.

The control unit may interrupt the power supply to the cleaning unit, when a time required to move on the already cleaned area exceeds a reference time.

The control unit may interrupt the power supply from the power converting unit to the cleaning unit, when the cleaning robot is in a returning mode in which the cleaning robot returns to a docking station in order to perform a charging operation.

The control unit may interrupt the power supply from the power converting unit to the cleaning unit, when the cleaning robot is in an inspecting mode in which the cleaning robot inspects an area to be cleaned.

The second voltage may be in a higher level than the first voltage.

The cleaning unit may include an air blowing unit in which a fan is rotated by a motor so as to generate a sucking force.

The power converting unit may convert and output the power supplied from the battery into a third voltage driving the control unit.

In accordance with one or more embodiments, a method of controlling a cleaning robot may include receiving power having a first voltage from a battery, driving a moving unit, and moving on a cleaning area, receiving power having a second voltage, which is higher than the first voltage, from the battery, driving a cleaning unit, and performing a cleaning operation on the cleaning area, and stopping the cleaning operation according to at least one of a cleaning state and an operation mode.

The stopping of the cleaning operation may be performed when the cleaning robot moves on an already cleaned area of the cleaning area.

The stopping of the cleaning operation may be performed when a moving distance on the already cleaned area exceeds a preset distance in a case in which the cleaning robot moves on the already cleaned area of the cleaning area.

The stopping of the cleaning operation may be performed when an estimated moving time on the already cleaned area exceeds a preset time in a case in which the cleaning robot moves on the already cleaned area of the cleaning area.

The stopping of the cleaning operation may be performed when the cleaning robot is in an inspecting mode in which the cleaning robot inspects an area to be cleaned.

The method may further include determining whether a charging operation of the battery is needed, and the stopping of the cleaning operation may be performed when the cleaning robot is in a returning mode in which the cleaning robot returns to a docking station in order to perform the charging operation.

The returning to the docking station may be performed based on route information which is already secured.

The method may further include inspecting the docking station in order to perform the charging operation, if it is determined that the battery needs to be charged, and the stopping of the cleaning operation may be performed while the cleaning robot inspects the docking station in order to perform the charging operation of the battery.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
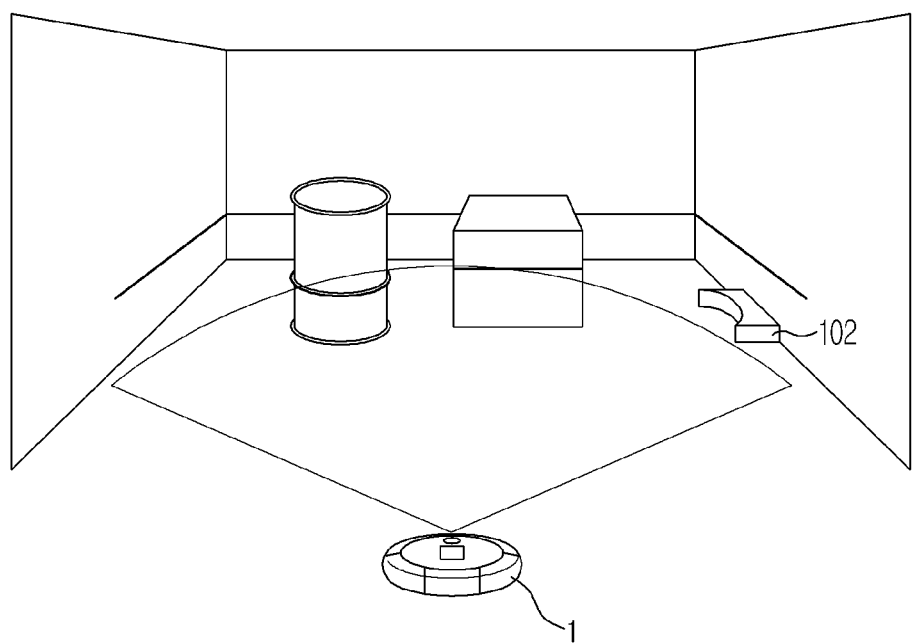
FIG. 1 is a view of a cleaning robot in accordance with one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 is a view of a cleaning robot in accordance with one or more embodiments. As illustrated in FIG. 1, a cleaning robot 1 is an apparatus which may move on a cleaning area to be cleaned by itself without an operation of a user and may automatically clean the cleaning area by sucking foreign substances such as dust from a floor surface. The cleaning robot 1 may detect obstacles or walls located in the cleaning area using various kinds of sensors, and a moving route and a cleaning operation of the cleaning robot 1 may be controlled based on detected results.

Particularly, the cleaning robot 1 may radiate a sheet beam while moving in a room, and may detect obstacles located at a position to which the sheet beam is radiated. As described later, the sheet beam means thin light which is radiated from a light source and progresses on the same plane in multiple directions.

As described above, the cleaning robot 1 having an obstacle detecting unit (i.e., an obstacle detector) 14 (FIG. 2) for detecting the obstacles may detect obstacles in an omnidirectional or a fan-shaped wide area. Further, the cleaning robot 1 may measure a distance from an obstacle, a position of the obstacle, a height of the obstacle, a shape of the obstacle, and an estimated crash place of the cleaning robot 1 on the basis of the detected results of the obstacle detecting unit 14. Based on this information, the cleaning robot 1 may judge environmental conditions of the cleaning area and perform a cleaning operation. The cleaning robot 1 may be charged by power from a docking station 102.

Figure 2:
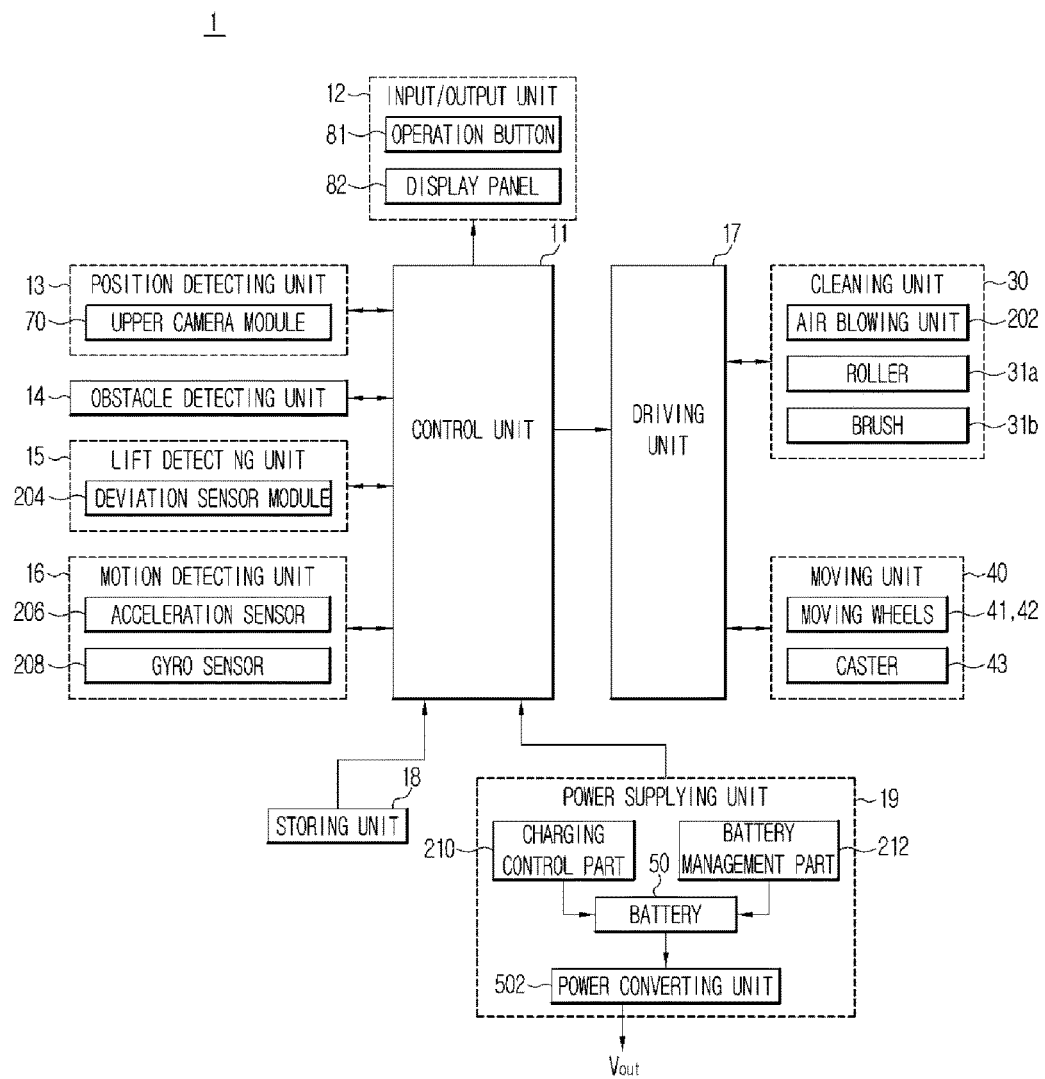
FIG. 2 is a block diagram illustrating a control flow of a cleaning robot in accordance with one or more embodiments.
Figure 3:
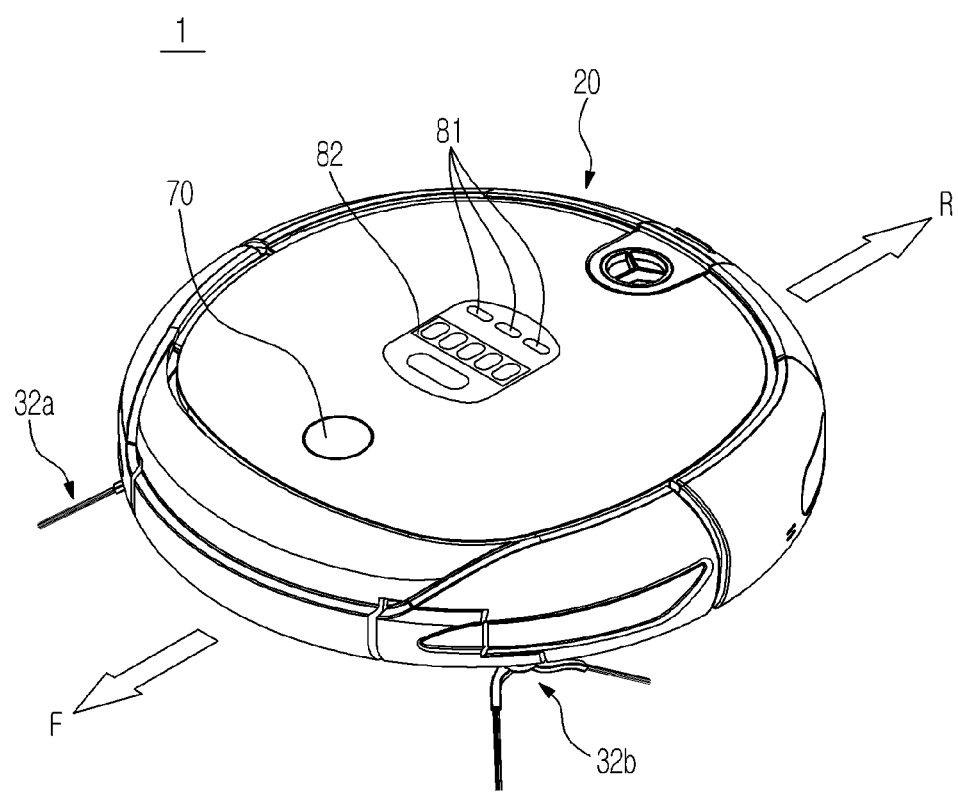
FIG. 3 is a perspective view of a cleaning robot in accordance with one or more embodiments.
Figure 4:
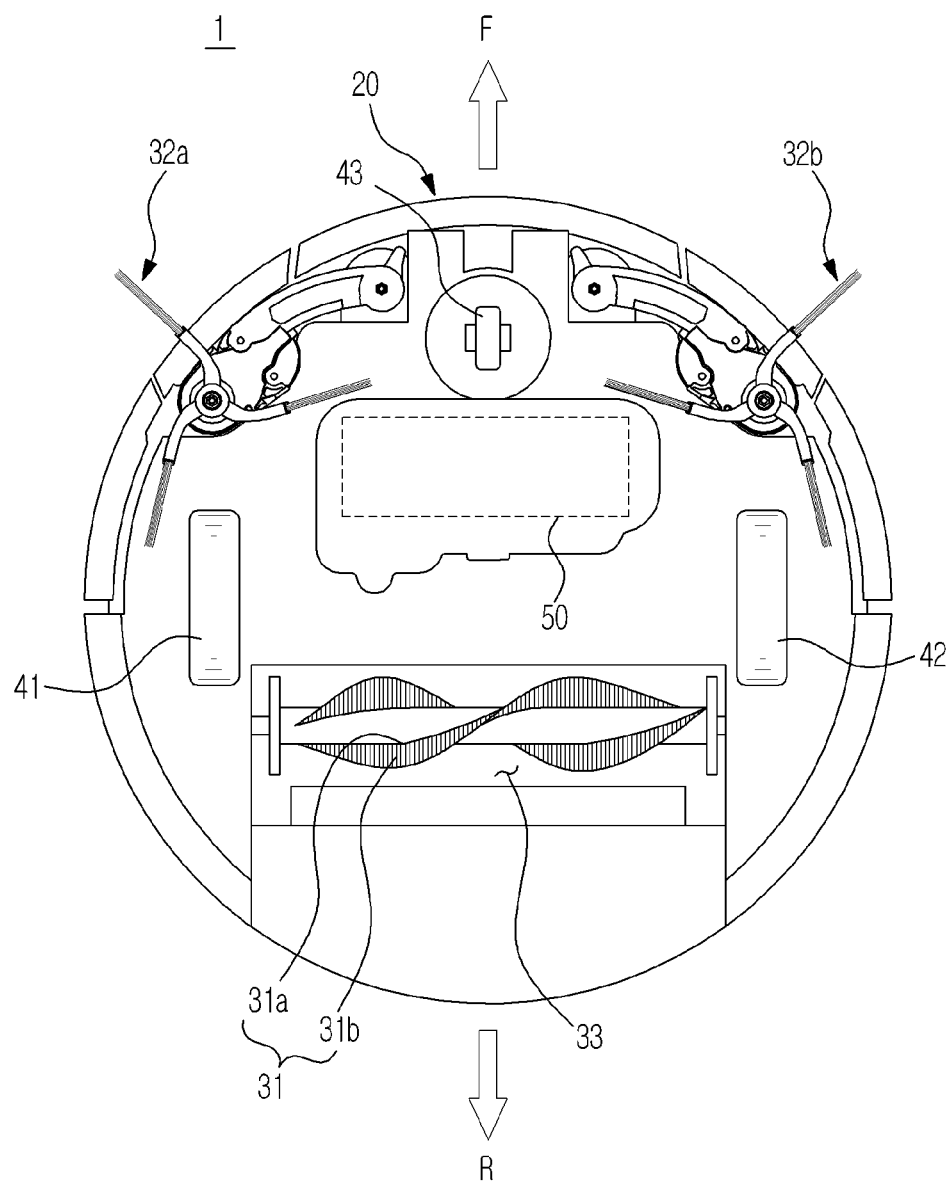
FIG. 4 is a bottom view of a cleaning robot in accordance with one or more embodiments.

FIG. 2 is a block diagram illustrating a control flow of a cleaning robot in accordance with one or more embodiments, FIG. 3 is a perspective view of a cleaning robot in accordance with one or more embodiments, and FIG. 4 is a bottom view of a cleaning robot in accordance with one or more embodiments.

Referring to FIGS. 2 to 4, an exterior of the cleaning robot 1 may be defined by a main body 20. The cleaning robot 1 may include a cleaning unit 30 which may clean a cleaning area, a moving unit 40 which may move the cleaning robot 1, an input/output unit 12 which may receive an operation command from a user and may display operation information of the cleaning robot 1, a position detecting unit (i.e., a position detector) 13 which may detect a position of the cleaning robot 1 in the cleaning area, the obstacle detecting unit 14 which may detect the obstacles in the cleaning area, a lift detecting unit (i.e., a lift detector) 15 which may detect a state in which the cleaning robot 1 is lifted up from a floor of the cleaning area, a motion detecting unit (i.e., a motion detector) 16 which may detect a motion of the cleaning robot 1, a driving unit (i.e., a driver) 17 which may drive the moving unit 40 and the cleaning unit 30, a storing unit (i.e., a storage) 18 which may store various data, a power supplying unit 19 which may supply power to the cleaning robot 1, and a control unit 11 which may control each construction element of the cleaning robot 1.

The cleaning unit 30 may include a main brush 31 which may sweep dust on the floor and may guide the dust to a suction part, and side brushes 32a and 32b which may clean a portion adjacent to a wall and a corner portion.

The main brush 31 may be installed at an opening 33 formed at a lower portion of the main body 20 so as to clean the dust on the floor on which the main body 20 is located. The opening 33 may be provided toward a rear side R from a lower central portion of the main body, and also may serve as a dust suction part. The main brush 31 may include a roller 31a, and a brush 31b which may be fixedly inserted into an outer circumferential surface of the roller 31a.

The roller 31a may serve to rotate the brush 31b, and the brush 31b may serve to stir the dust on the floor by rotation of the roller 31a and thus to enable the dust to be introduced into the opening 33. At this time, the roller 31a may be formed, for example, of a strong steel material, and the brush 31b may be formed, for example, of various elastic materials. However, embodiments are not limited thereto.

Further, the cleaning unit 30 may include an air blowing unit 202 which may be provided in the opening 33 and in which a fan may be rotated by a motor so as to generate a sucking force. The dust guided to the dust suction part may be moved to a dust collecting device (not shown) by the air blowing unit 202.

The moving unit 40 may include moving wheels 41 and 42 which may move the main body 20 of the cleaning robot according to a movement control signal, and a caster 43 which may be rotated according to a moving direction of the cleaning robot 1 so that the main body 20 may maintain a stable posture.

For example, the two moving wheels 41 and 42 may be symmetrically disposed at left and right edge portions of a lower central area of the main body 20. The moving wheels 41 and 42 may enable the cleaning robot 1 to move forward and backward and rotate during the cleaning operation through a control of a driving circuit.

The caster 43 may be installed at a lower front edge portion of the main body 20 based on the moving direction.

As described above, the moving wheels 41 and 42 and the caster 43 may be formed as one assembly, and may be installed at the main body 20 or separated from the main body 20.

The input/output unit 12 may be provided on an upper surface of the main body 20 of the cleaning robot 1, and may include a plurality of operation buttons 81 through which the user's operation commands related to the cleaning robot 1, such as an operation or stop mode and a moving mode of the cleaning robot 1, may be input, and a display panel 82 which may display operation information of the cleaning robot 1, such as the operation or stop mode and the moving mode of the cleaning robot 1. The operation buttons 81 may employ membrane switches, and the display panel 82 may employ a liquid crystal display (LCD) panel or a light emitting diode (LED) panel.

The position detecting unit 13 may include an upper camera module 70 which may take an upper image from the cleaning robot 1, i.e., a ceiling image of a cleaning space.

For example, when the cleaning robot 1 moves in a random direction without a preset route, i.e., without a map, the position detecting unit 13 may take an upper image from the cleaning robot 1 through the upper camera module 70 and thus may generate position information of the cleaning robot 1.

The obstacle detecting unit 14 may radiate a sheet beam to front and lateral sides of the cleaning robot 1, may detect the sheet beam reflected from obstacles, and thus may detect the obstacles. The obstacle detecting unit 14 may be installed at the moving direction side, i.e., a front surface of the cleaning robot 1. However, when a plurality of obstacle detecting units 14 are provided, they may be installed at other positions.

The lift detecting unit 15 may include a deviation sensor module 204 which may detect a deviation of the moving wheels 41 and 42. Specifically, when the cleaning robot 1 is lifted from the floor surface of the cleaning space, the moving wheels 41 and 42 are deviated from their original position, and the deviation sensor module 204 may detect the deviation of the moving wheels 41 and 42.

The motion detecting unit 16 may include an acceleration sensor 206 which may detect a translational movement and a rotational movement of the cleaning robot 1, a gyro sensor 208, and so on, and may generate moving information of the cleaning robot 1.

The storing unit 18 may include a non-volatile memory, such as a magnetic disc and solid state disk, which permanently may store a program and control data for controlling motions of the cleaning robot 1, and a volatile memory, such as a D-RAM and an S-RAM, which may store temporary data generated while controlling the motions of the cleaning robot 1.

The power supplying unit 19 may include a battery 50 which may supply power to each construction unit of the cleaning robot 1. Further, the power supplying unit 19 further may include a charging control part (i.e., a charging controller) 210 which may control a charging operation of the battery 50, a battery management part (i.e., a battery manager) 212 which may manage power consumption of the battery 50, and a power converting unit 502 (e.g., a switching mode power supply (SMPS)) which may convert a DC voltage supplied from the battery 50 into a voltage level required in a load.

At this time, the battery 50 may be, for example, a secondary battery which may be recharged. In a case in which the main body 20 is coupled to the docking station 102 after a cleaning operation, the battery 50 may receive power from the docking station 102 and thus may be charged.

The control unit 11 may serve to control the operation of the cleaning robot 1 based on detected results of the obstacle detecting unit 14. For example, the control unit 11 may set a moving route based on detected obstacle information related to a surrounding environment of the cleaning robot 1, and may generate an operation control signal which may control the moving or cleaning operation of the cleaning robot 1 along the moving route.

At this time, the detected obstacle information may include a distance between the main body and an obstacle, a position of the obstacle, a height of the obstacle, a shape of the obstacle and an estimated crash place of the cleaning robot 1. The detected obstacle information may be received from the obstacle detecting unit 14, or may be directly produced in the control unit 11.

Figure 5:
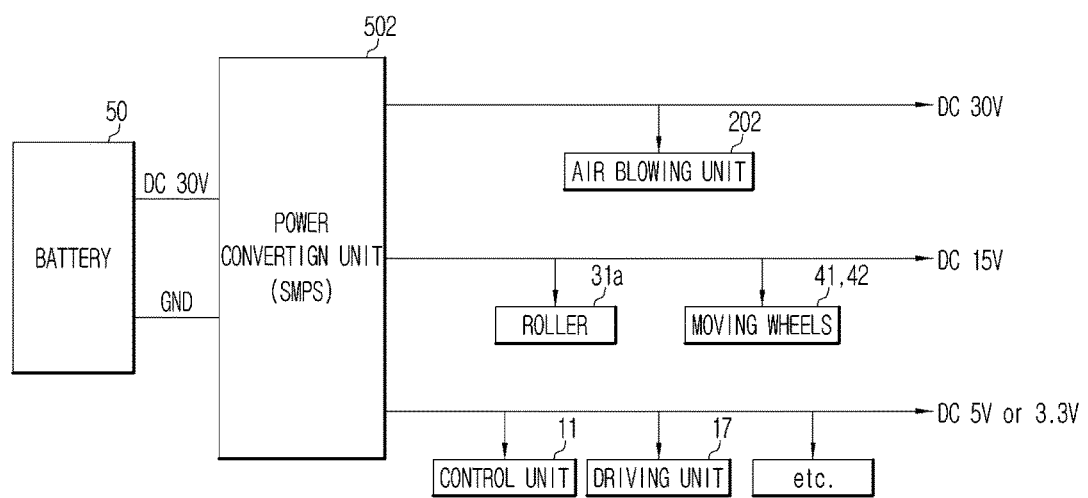
FIG. 5 is a view illustrating a power supplying system of a cleaning robot in accordance with one or more embodiments.

FIG. 5 is a view illustrating a power supplying system of a cleaning robot in accordance with one or more embodiments. As illustrated in FIG. 5, in the cleaning robot 1 according to one or more embodiments, a DC voltage of, for example, 30 V supplied from the battery 50 may be converted into various voltages by the power converting unit 502 (e.g., the SMPS) and then may be supplied to each unit of the cleaning robot 1.

For example, a DC voltage of, for example, 30 V supplied from the battery 50 may be directly supplied to a motor which may drive the air blowing unit 202. The air blowing unit 202 may require powerful rotation of the fan in order to generate a high sucking force, and thus may receive the highest DC voltage of, for example, 30 V which may be provided from the battery 50, and then may be operated.

Further, the DC voltage of, for example, 30 V supplied from the battery 50 may be converted into a DC voltage of, for example, 15 V by the power converting unit 502, and then may be supplied to the motors which drive the roller 31a and the moving wheels 41 and 42, respectively. The roller 31a and the moving wheels 41 and 42 may sufficiently fulfill their own functions only with a certain level of rotational speed, and thus the high DC voltage of, for example, 30 V is not needed. Since the roller 31a and the moving wheels 41 and 42 may be sufficiently operated only with a lower DC voltage of, for example, 15 V, they may receive the DC voltage of, for example, 15 V and then may be operated.

Further, the DC voltage of, for example, 30 V that may be supplied from the battery 50 may be converted into a low DC voltage of, for example, 5 V or 3.3 V by the power converting unit 502, and then may be supplied to the control unit 11 and the driving unit 17. An integrated circuit-based construction element, such as the control unit 11 and the driving unit 17, may perform a low voltage-based operation, such as an operation of calculation or generation of a low power control signal, and thus may receive the low DC voltage of, for example, 5 V or 3.3 V and then is operated.

As described above, in the cleaning robot 1 according to one or more embodiments, a required voltage level may be different according to the function. Therefore, the control unit 11 of the cleaning robot 1 according to one or more embodiments may control the cleaning robot 1 which may be operated in, for example, one of a moving mode, a cleaning mode, and an inspecting mode, etc. according to a current setting of the cleaning robot 1. In the case of the moving mode or the inspecting mode in which an operation of the cleaning unit 30 may not be required, the operation of the cleaning unit 30 may be stopped. Also, even in the case of the cleaning mode, when the operation of the cleaning unit 30 is not required, such as when the cleaning robot 1 moves on an already cleaned area, the operation of the cleaning unit 30 may be stopped, and thus the power consumption by the operation of the cleaning unit 30 may be reduced.

<First Embodiment: Cleaning Mode>

Figure 6A:
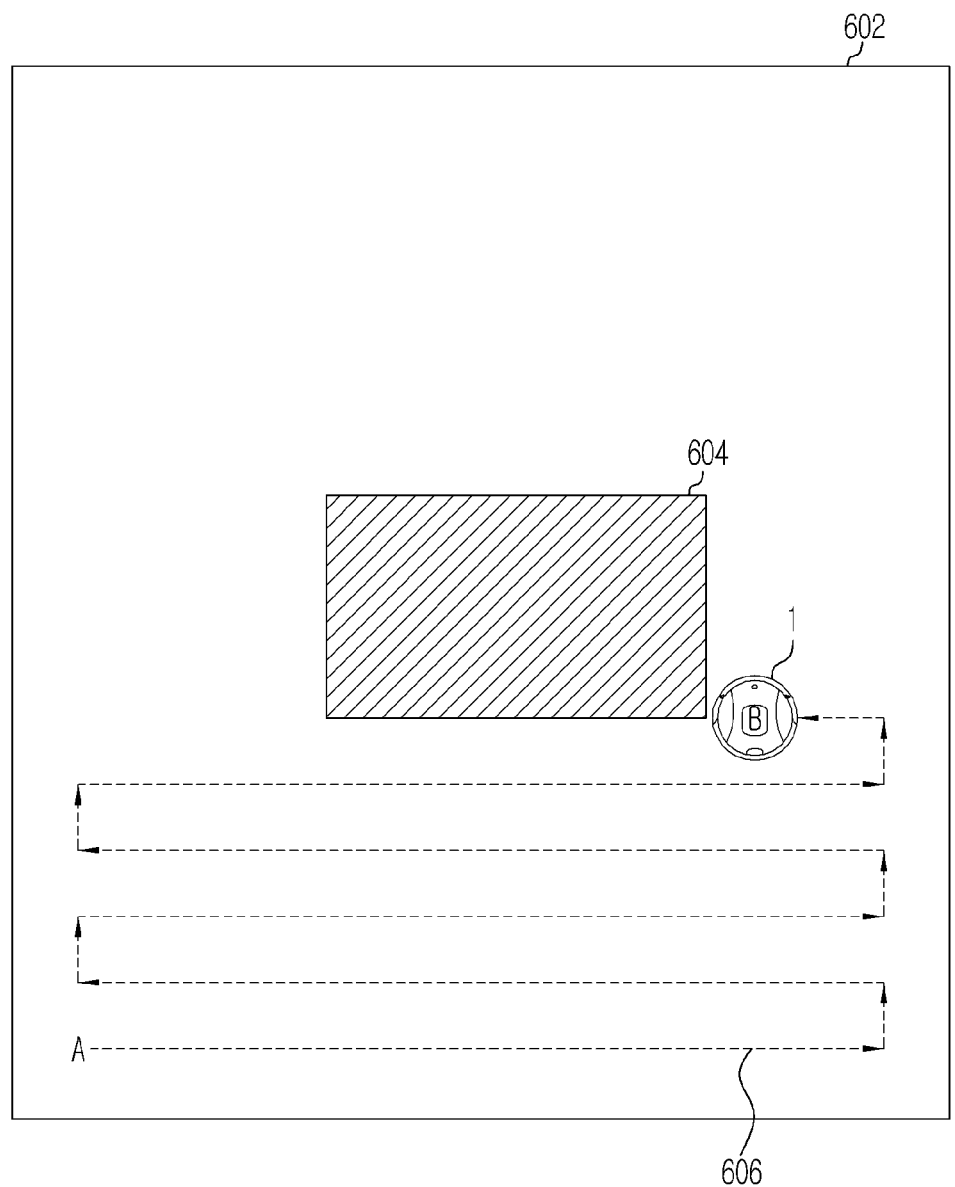
FIGS. 6A to 6E are views respectively illustrating a movement trajectory of a cleaning robot 1 in accordance with one or more embodiments.
Figure 6B:
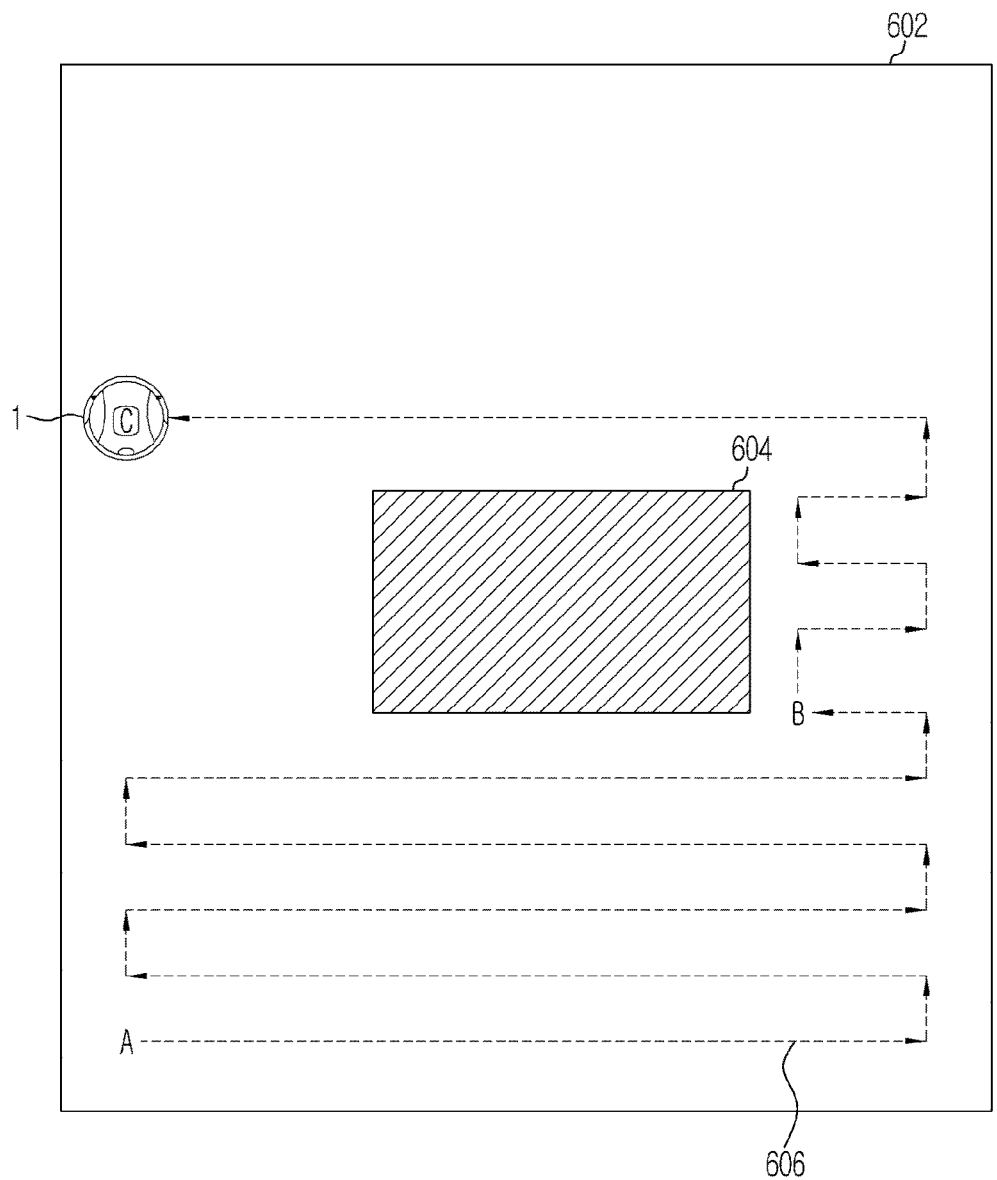
Figure 6C:
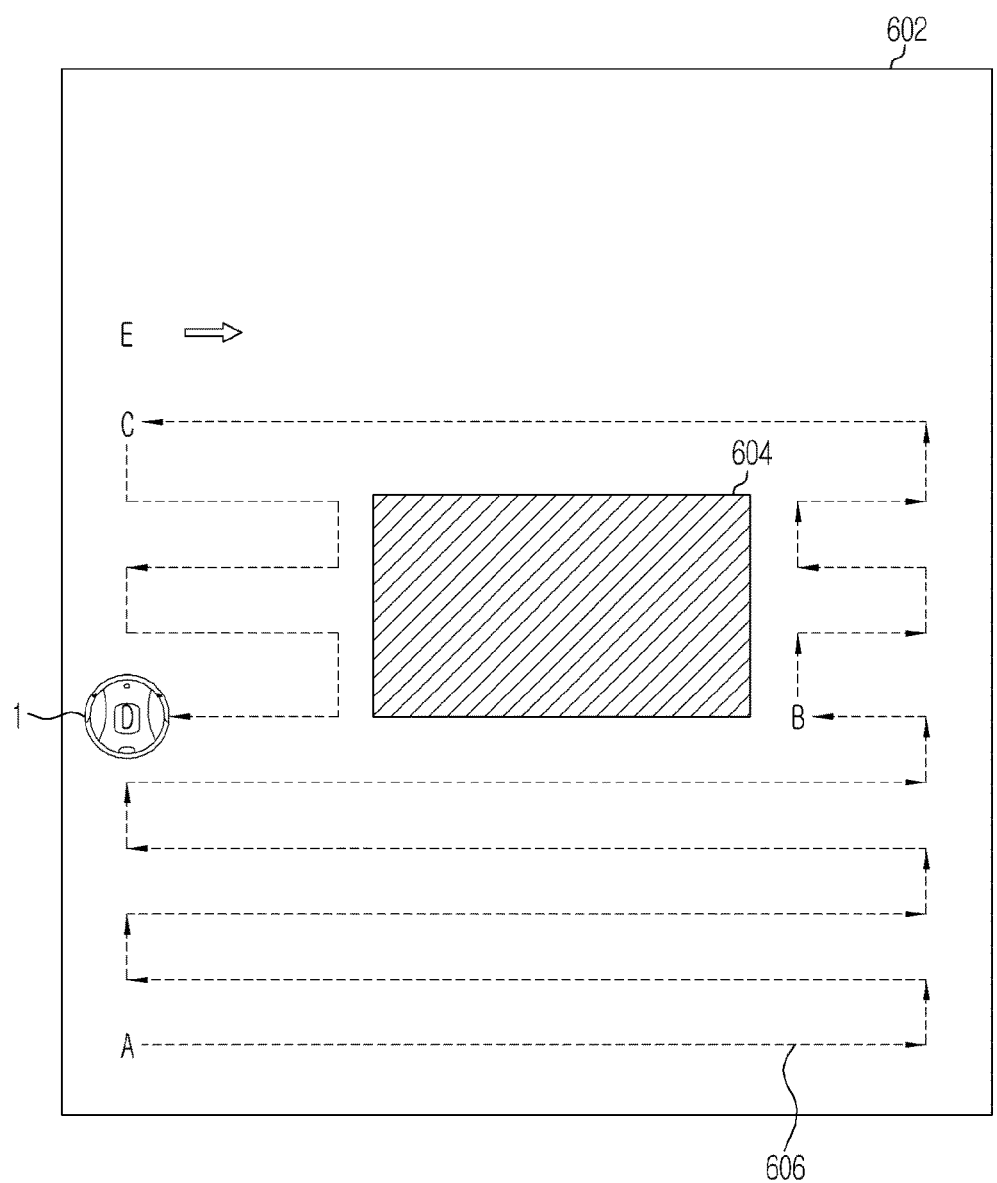
Figure 6D:
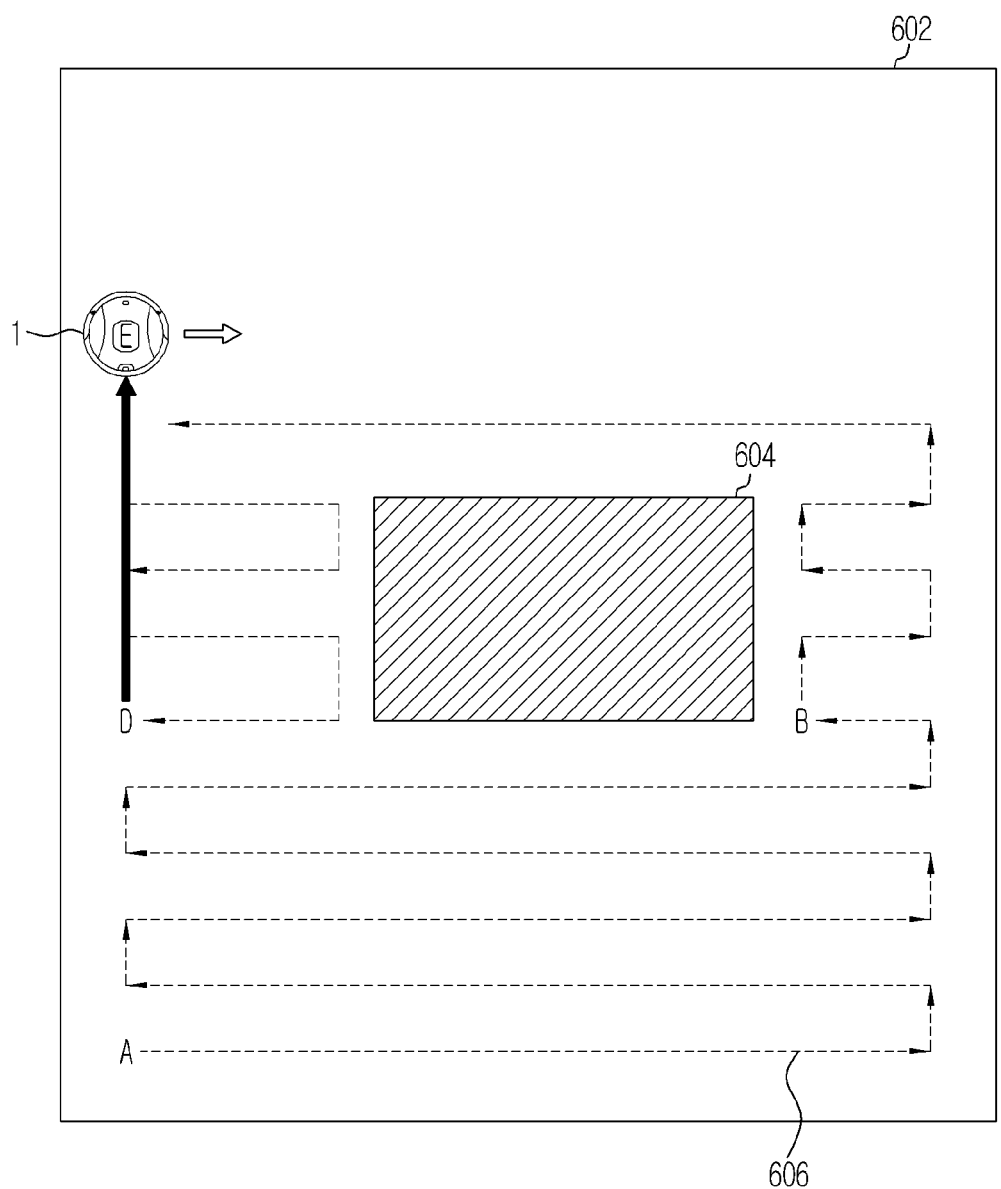
Figure 6E:
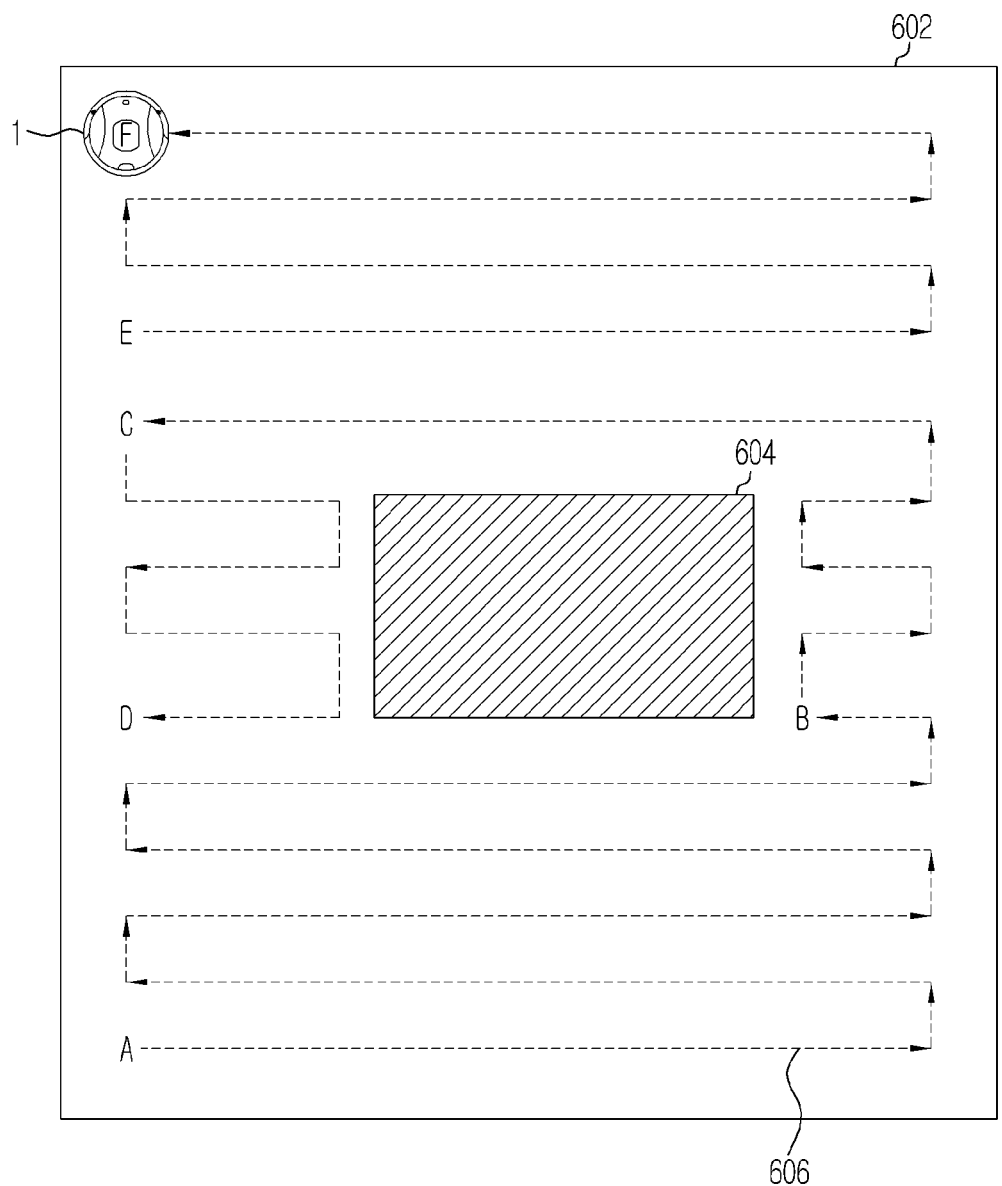
Figure 7:
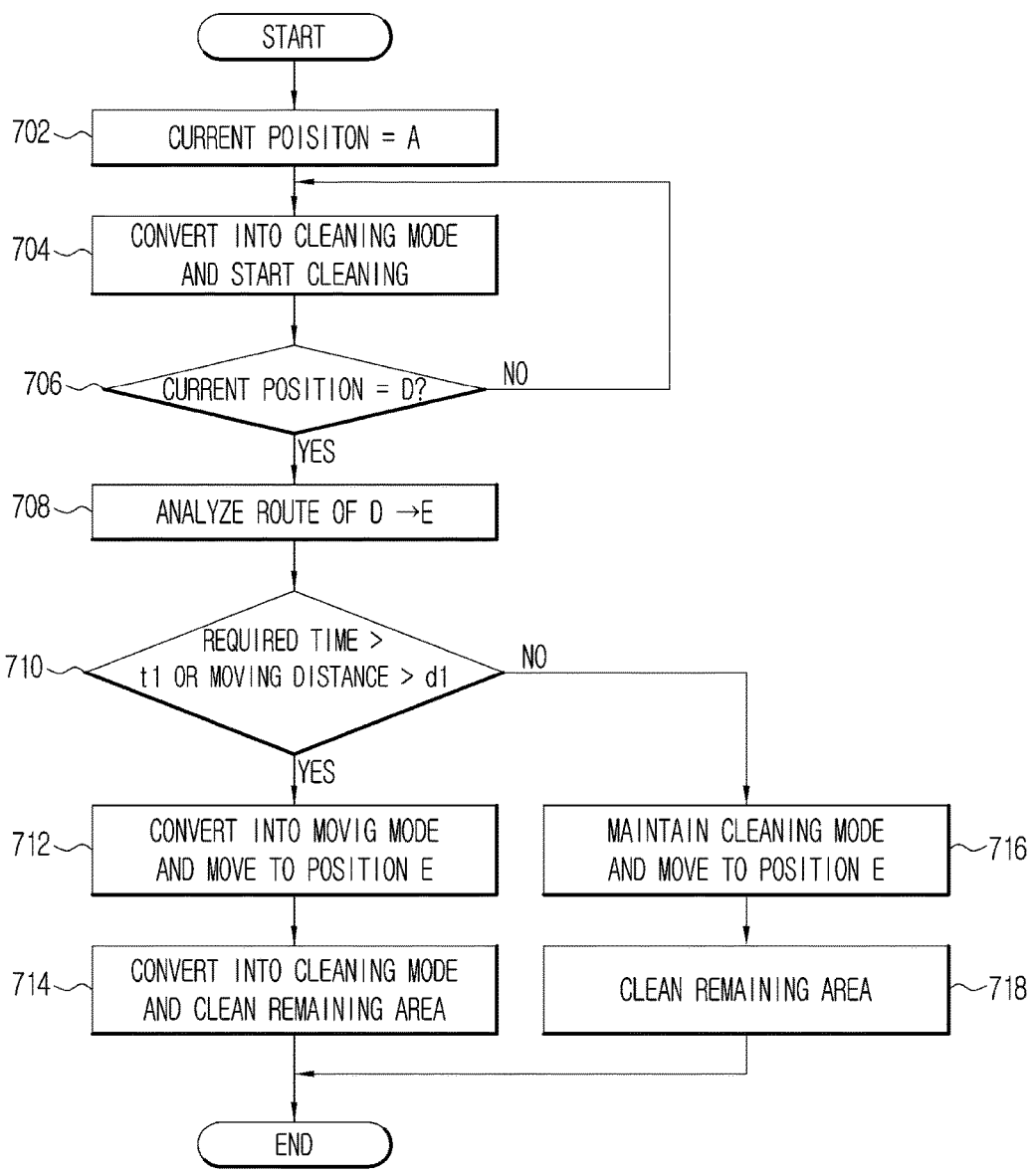
FIG. 7 is a flowchart of a control method of a cleaning robot in accordance with one or more embodiments.

FIGS. 6A to 6E and 7 are views respectively illustrating a method of controlling a cleaning robot in accordance with one or more embodiments, wherein FIGS. 6A to 6E are views respectively illustrating a movement trajectory of a cleaning robot in accordance with one or more embodiments, and FIG. 7 is a flowchart of a control method of a cleaning robot in accordance with one or more embodiments. A method of controlling a cleaning robot in accordance one or more embodiments will be described with reference to FIGS. 6A to 6E and 7.

In FIG. 6A, in order to perform the cleaning operation of a given cleaning area 602, the cleaning robot 1 may depart from a 'current position=A' and may perform the cleaning operation while moving along a route 606 of FIG. 6A (702 of FIG. 7). To this end, the cleaning robot 1 may convert the operation mode into the cleaning mode and may start the cleaning operation (704 of FIG. 7). The cleaning robot 1 may be in a state in which an inspection of a boundary and a size (surface area) of the cleaning area 602 is already finished. The cleaning robot 1 according to one or more embodiments may have a basic principle that changes a direction in order to avoid an obstacle (a structure, a wall, or the like), when meeting the obstacle on the move. Therefore, the cleaning robot 1 may move while changing the direction whenever meeting the wall, like a route between positions A and B of FIG. 6A, and then may meets an obstacle 604, which may be located around a central portion of the cleaning area 602, at the position B.

As illustrated in FIG. 6B, the cleaning robot 1 facing the obstacle 604 may perform the cleaning operation of a narrow area between a right side of the obstacle 604 and the wall, and after getting out of the obstacle 604, continuously may perform the cleaning operation while moving to a position C of FIG. 6B. At the position C of FIG. 6B, the cleaning robot 1 may move downward so as to clean a narrow area between a left side of the obstacle 604 and the wall, or may move upward so as to clean a wide area of an upper side of the obstacle 604.

As illustrate in FIG. 6C, when the cleaning robot 1 moves downward so as to clean the narrow area between the left side of the obstacle 604 and the wall, the cleaning robot 1 may move to a position D of FIG. 6C while performing the cleaning operation (706 of FIG. 7). Here, the cleaning robot 1 which finishes the cleaning operation to the position D of FIG. 6C has to move to a position E again, and then perform the cleaning operation of the remaining area of the cleaning area 602. To this end, the cleaning robot 1 has to pass through a 'already cleaned area' between the positions D and E of FIG. 6C. Also, when the cleaning robot 1 moves upward, cleans the wide area of the upper side of the obstacle 604, and then cleans the narrow area between the left side of the obstacle 604 and the wall, the cleaning robot 1 has to pass through the 'already cleaned area'.

For example, when the cleaning robot 1 has to pass through the 'already cleaned area' between the positions D and E of FIG. 6C, the cleaning robot 1 has to move along a route designated by a thick arrow between the positions D and E as shown in FIG. 6D. At this time, the control unit 11 of the cleaning robot 1 may analyze the route between the positions D and E, and may determine whether to switch the operation mode into the moving mode or the cleaning mode, while passing through the route between the positions D and E (708 of FIG. 7). That is, the control unit 11 may determine whether a time required to pass through the route between the positions D and E exceeds a preset time t1, or a moving distance of the route between the positions D and E exceeds a preset distance d1 (710 of FIG. 7). Since the cleaning robot 1 has already performed the cleaning operation of the area between the positions C and D, and thus knows a distance between the positions C and D, it may be possible to calculate the required time and the moving distance from the position D to the position E via the position C.

If the time required to pass through the route between the positions D and E exceeds the preset time t1, or the moving distance of the route between the positions D and E exceeds the preset distance d1, or both of the two conditions are satisfied ('Yes' of 710 of FIG. 7), the control unit 11 may convert the operation mode of the cleaning robot 1 from the cleaning mode into the moving mode, and then may move from the position D to the position E (712 of FIG. 7). The cleaning robot 1 which has moved to the position E may convert again the operation mode from the moving mode to the cleaning mode, and then may perform the cleaning operation of the remaining area of the upper side of the obstacle 604 (714 of FIG. 7).

On the contrary, if the time required to pass through the route between the positions D and E is less than the preset time t1, or the moving distance of the route between the positions D and E is less than the preset distance d1, or both of the two conditions are not satisfied ('No' of 710 of FIG. 7), the control unit 11 may maintain the operation mode of the cleaning robot 1 in the cleaning mode, and the cleaning robot 1 may move from the position D to the position E (716 of FIG. 7). The cleaning robot 1 which has moved to the position E may perform the cleaning operation of the remaining area of the upper side of the obstacle 604 (718 of FIG. 7).

In FIGS. 6A to 6E and 7, when the cleaning robot 1 passes through the already cleaned area, like the route between the positions D and E, again, the control unit 11 of the cleaning robot 1 according to one or more embodiments may control the cleaning robot 1 to move in a state in which the air blowing unit 202 and the roller 31a used for the cleaning operation are stopped, thereby possibly saving the power consumption of the battery 50. The air blowing unit 202 to generate a strong sucking force at the cleaning robot 1 may have to rotate at a high speed, and thus high power consumption may be required. Therefore, if the operation of the air blowing unit 202 is stopped, the power consumption may be considerably reduced. Therefore, when the cleaning robot 1 passes through the already cleaned area, again, like the route between the positions D and E, the cleaning robot 1 may be controlled to move in the state in which the air blowing unit 202 used for the cleaning operation is stopped, and thus the power consumption may be considerably reduced. Furthermore, if the operation of the roller 31*a* which is used for cleaning operation is also stopped, the power saving effect may be enhanced.

However, in the case in which the cleaning robot 1 converts the operation mode into the moving mode and then moves the route between the positions D and E only when the time required to pass through the route between the positions D and E exceeds the preset time t1, or the moving distance of the route between the positions D and E exceeds the preset distance d1, or both of the two conditions are satisfied, like the operations 712 and 714 of FIG. 7, if the route between the positions D and E is too short, the power consumption due to re-operation of the motors when the air blowing unit 202, the roller 31*a*, and the like are stopped and then re-operated may be greater than the power saving effect obtained when the cleaning robot 1 may convert the operation mode from the cleaning mode into the moving mode and then moves. As a result, the power saving effect may not be expected. Therefore, the cleaning robot 1 may convert the operation mode into the moving mode and then may move, only when the power saving effect may be expected in consideration of the moving distance or time along the route between the positions D and E.

<Second Embodiment: Inspecting Mode and Cleaning Mode>

Figure 8A:
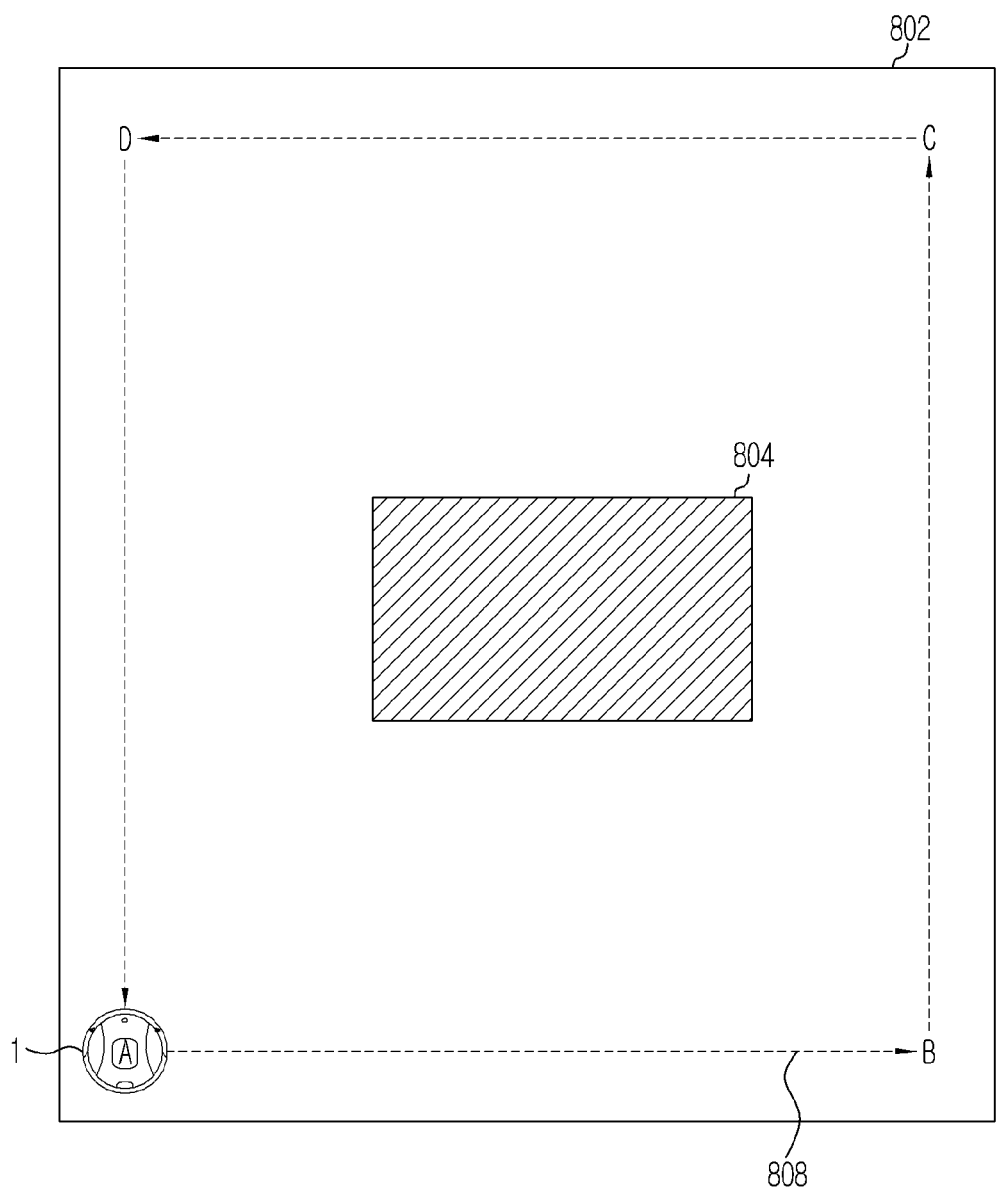
FIGS. 8A to 8F are views respectively illustrating a movement trajectory of a cleaning robot 1 in accordance with one or more embodiments.
Figure 8B:
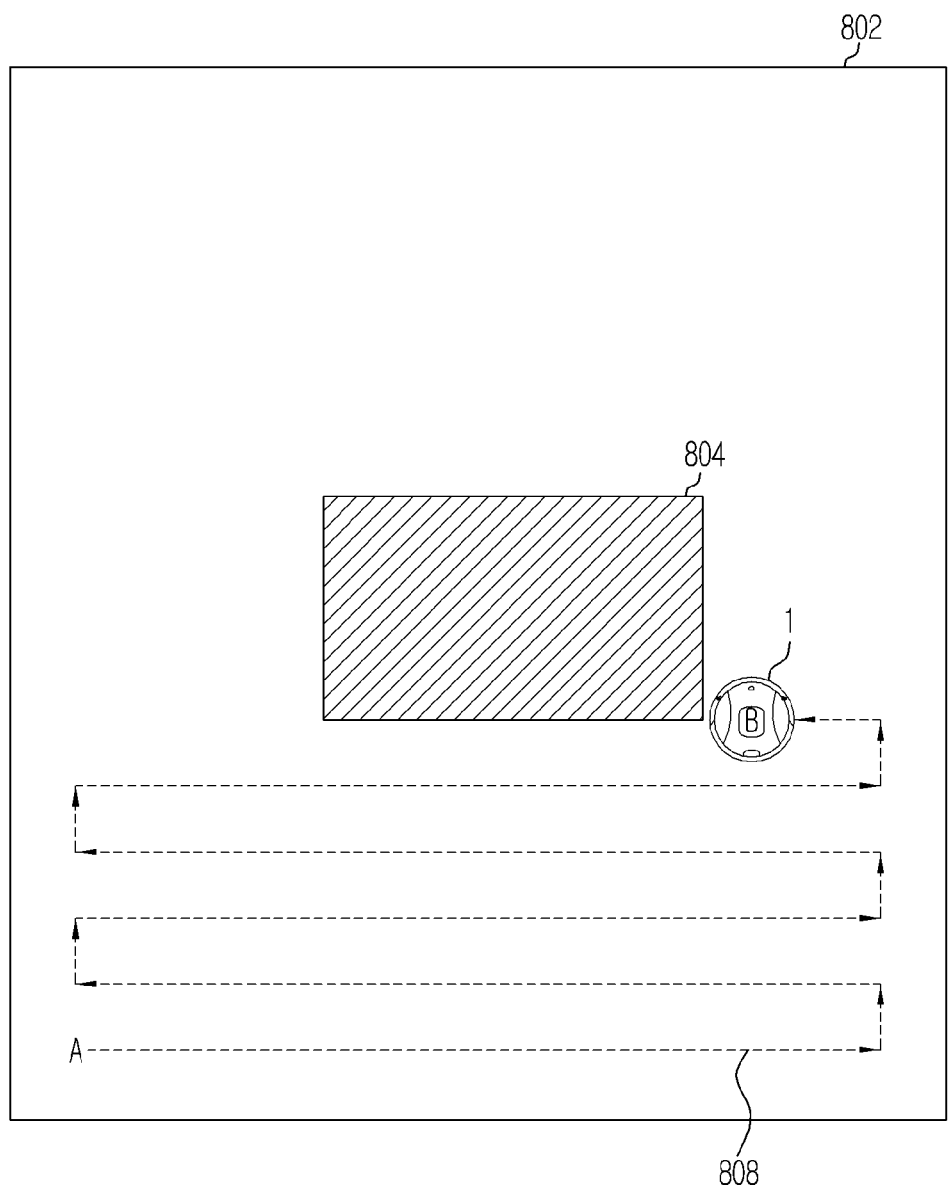
Figure 8C:
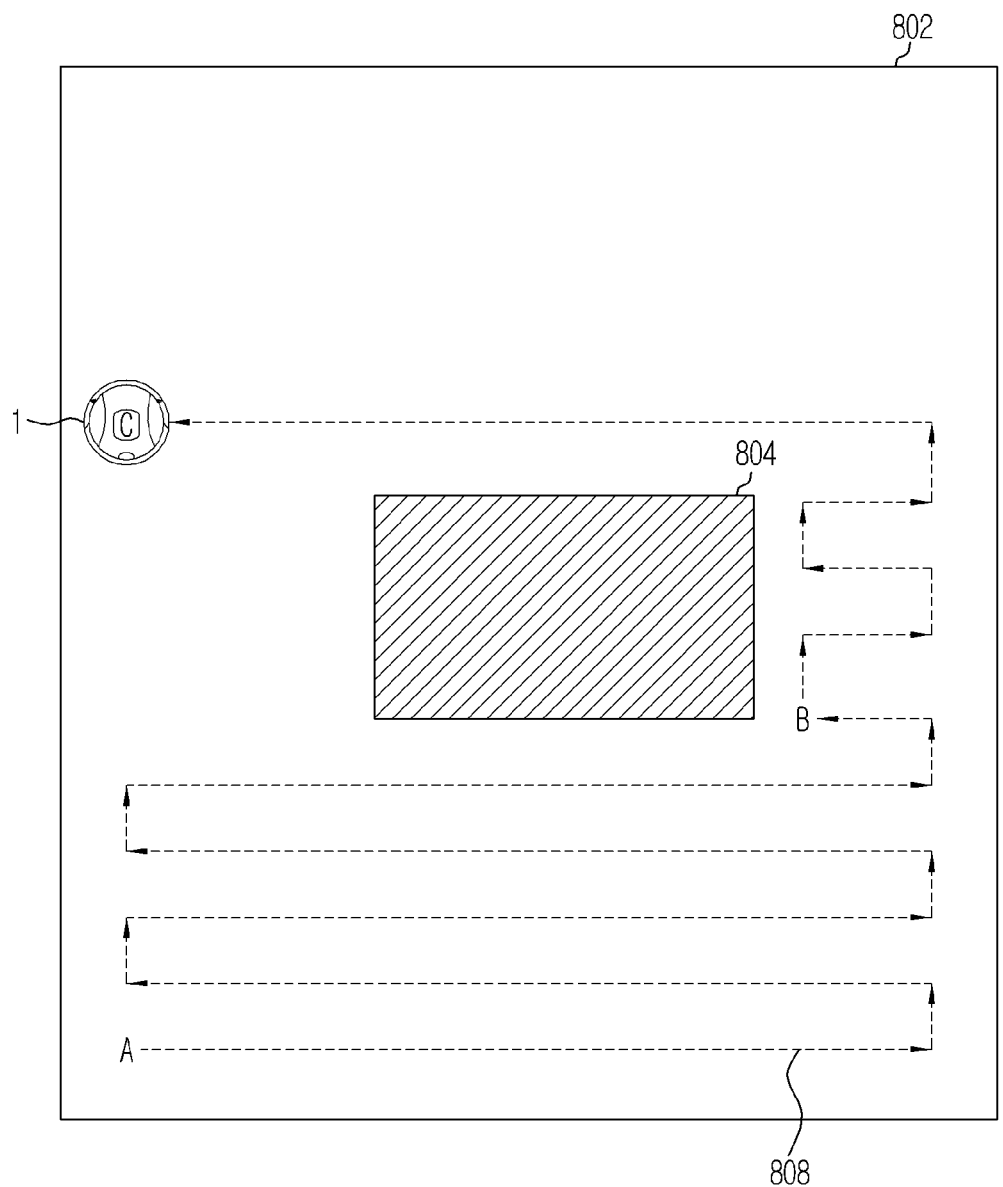
Figure 8D:
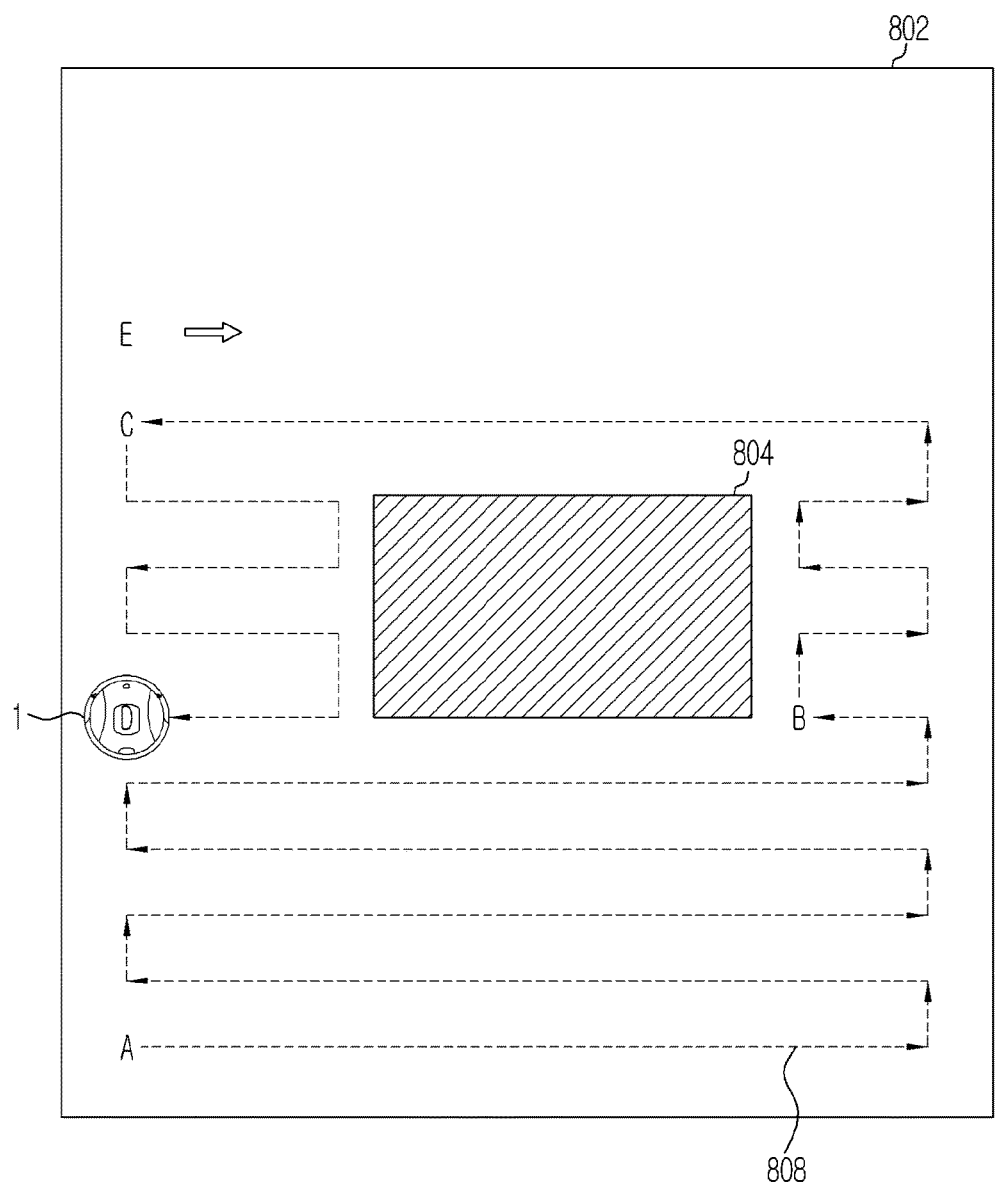
Figure 8E:
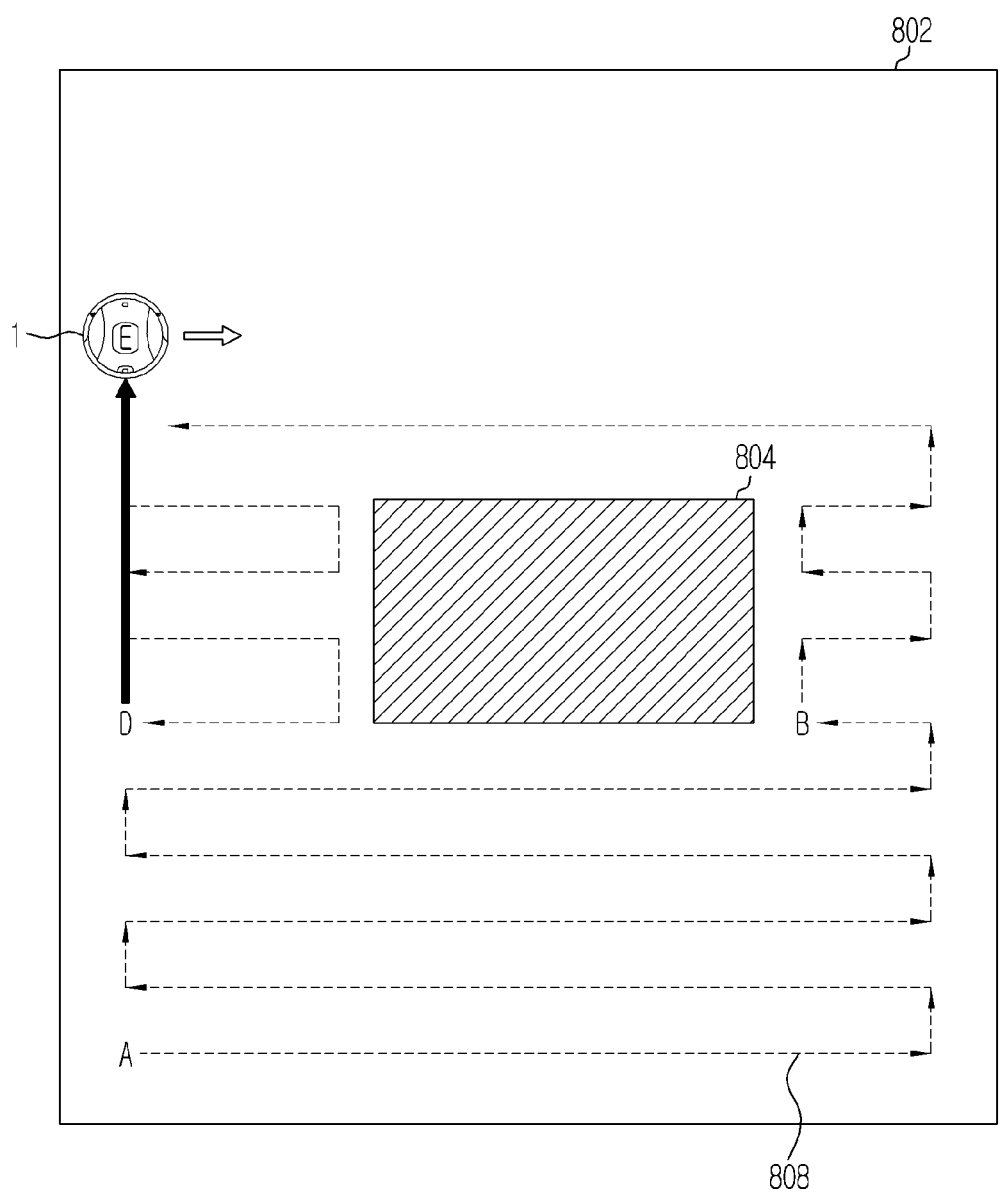
Figure 8F:
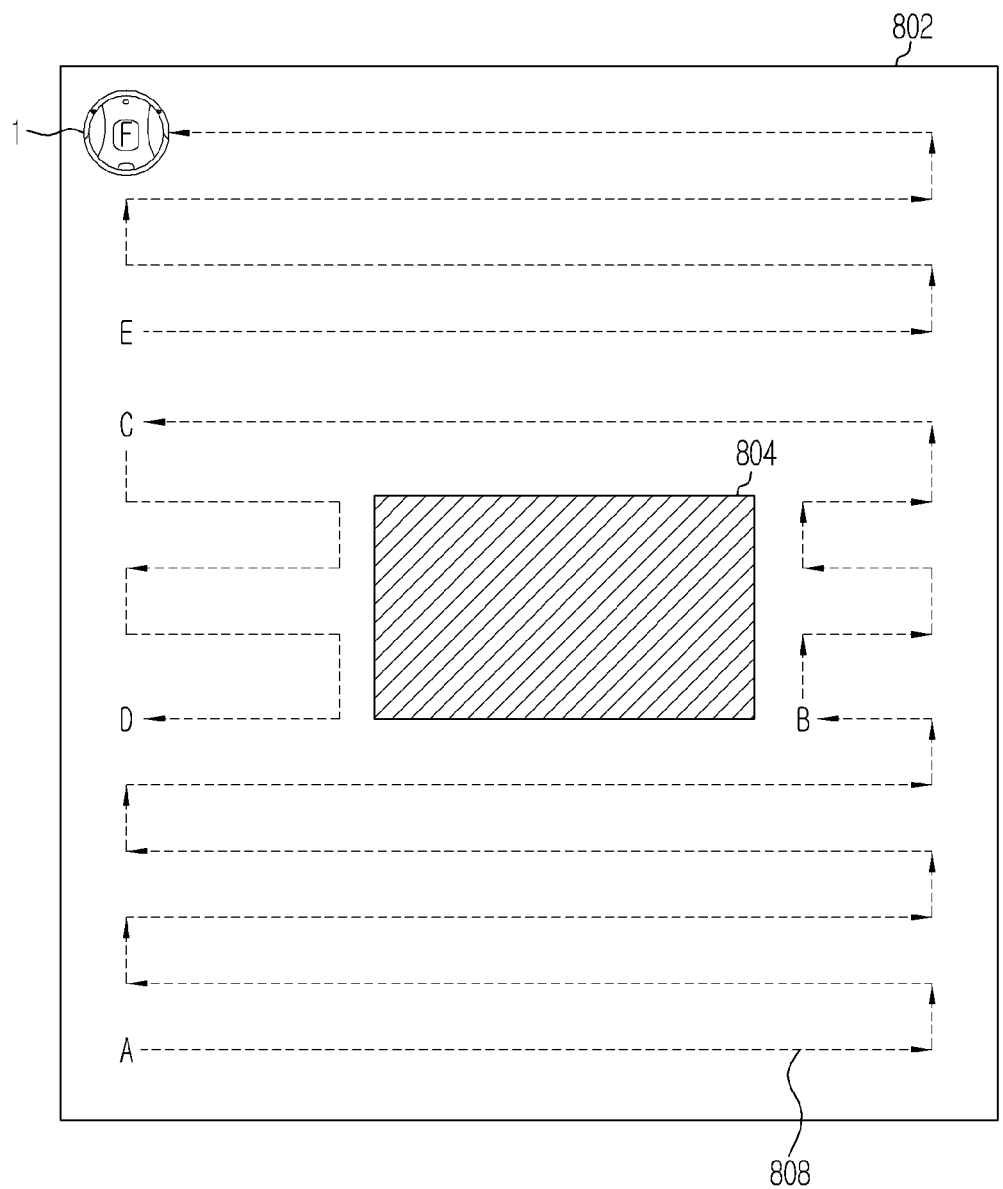
Figure 9:
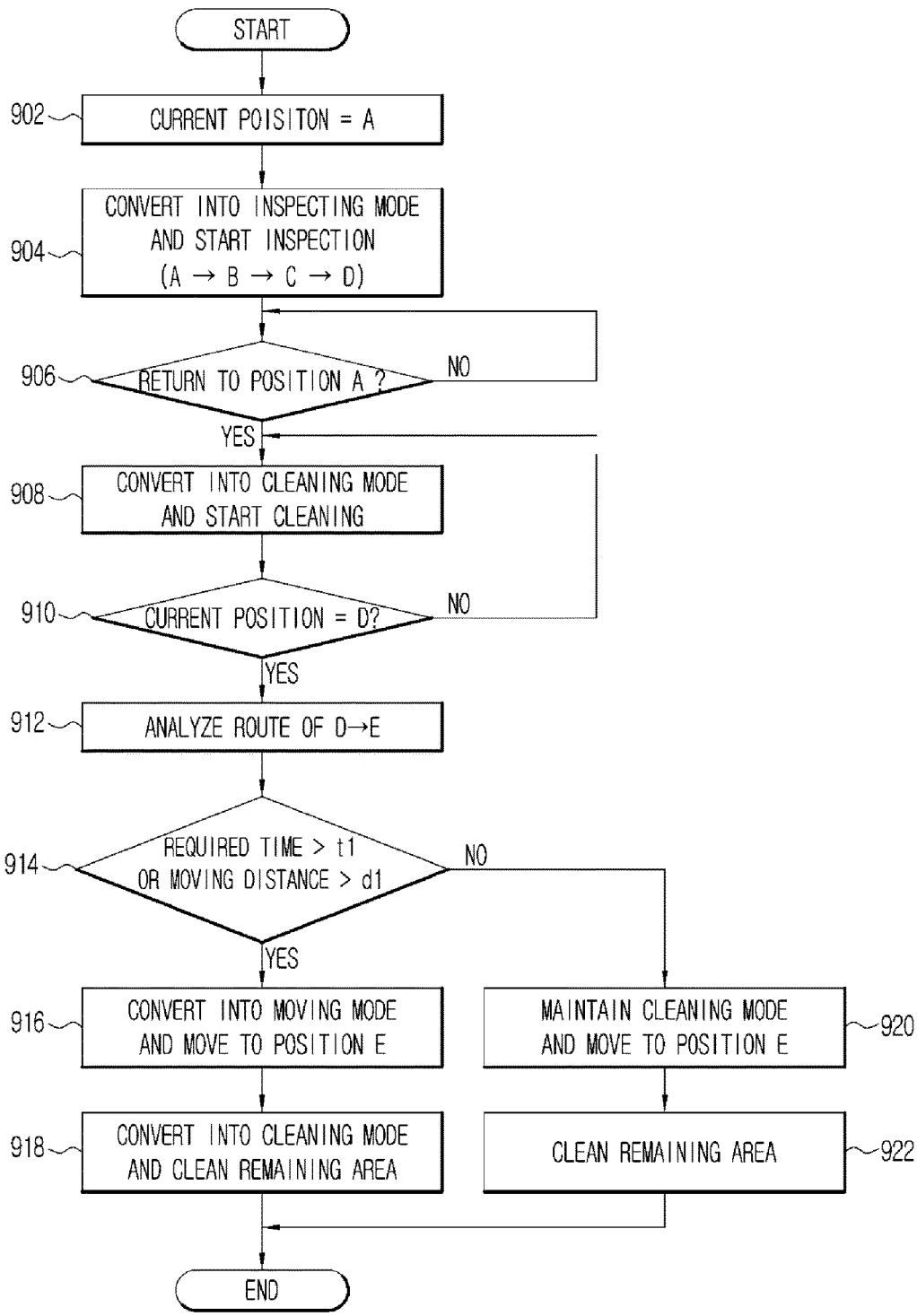
FIG. 9 is a flowchart of a control method of a cleaning robot in accordance with one or more embodiments.

FIGS. 8A to 8F and 9 are views respectively illustrating a control method of a cleaning robot in accordance with one or more embodiments, wherein FIGS. 8A to 8F are views respectively illustrating a movement trajectory of a cleaning robot in accordance with one or more embodiments, and FIG. 9 is a flowchart of a control method of a cleaning robot in accordance with one or more embodiments. A method of controlling a cleaning robot in accordance with one or more embodiments will be described with reference to FIGS. 8A to 8F and 9.

In FIG. 8A, in order to grasp a boundary and a size (surface area) of a given cleaning area 802 before performing the cleaning operation of the cleaning area 802, the cleaning robot 1 may depart from a 'current position=A' and may perform an inspecting operation while moving along a route of A, B, C, and D, like 808 of FIG. 8A (902 of FIG. 9). To this end, the cleaning robot 1 may convert the operation mode into the inspecting mode, and then may perform the inspecting mode (904 of FIG. 9). In the inspecting mode, the control unit 11 of the cleaning robot 1 may control the cleaning robot 1 to move in a state in which the air blowing unit 202 and the roller 31*a* necessary for the cleaning operation may be stopped, thereby possibly saving the power consumption of the battery 50.

In FIG. 8B, if the inspecting operation of the cleaning area is completed, the cleaning robot 1 may depart from the 'current position=A' and may perform the cleaning operation while moving along a route 806 of FIG. 8B in order to perform the cleaning operation of the given cleaning area 802 (906 of FIG. 9). To this end, the cleaning robot 1 may convert the operation mode into the cleaning mode and may start the cleaning operation (908 of FIG. 9). The cleaning robot 1 may be in a state in which the inspection of the boundary and the size (surface area) of the cleaning area 802 is already finished. The cleaning robot 1 according to one or more embodiments may have the basic principle that changes a direction in order to avoid an obstacle (a structure, a wall, or the like), when meeting the obstacle on the move. Therefore, the cleaning robot 1 may move while changing the direction whenever meeting the wall, like a route between positions A and B of FIG. 8B, and then may meets an obstacle 804, which is located around a central portion of the cleaning area 802, at the position B.

As illustrated in FIG. 8C, the cleaning robot 1 facing the obstacle 804 may perform the cleaning operation of a narrow area between a right side of the obstacle 804 and the wall, and after getting out of the obstacle 804, continuously may perform the cleaning operation while moving to a position C of FIG. 8C. At the position C of FIG. 8C, the cleaning robot 1 may move downward so as to clean a narrow area between a left side of the obstacle 804 and the wall, or may move upward so as to clean a wide area of an upper side of the obstacle 804.

As illustrate in FIG. 8D, when the cleaning robot 1 moves downward so as to clean the narrow area between the left side of the obstacle 804 and the wall, the cleaning robot 1 may move to a position D of FIG. 8D, while performing the cleaning operation (910 of FIG. 9). Here, the cleaning robot 1 which has finished the cleaning operation to the position D of FIG. 8D may have to move to a position E again, and then perform the cleaning operation of the remaining area of the cleaning area 802. To this end, the cleaning robot 1 may have to pass through the 'already cleaned area' between the positions D and E of FIG. 8D. Also, when the cleaning robot 1 moves upward, cleans the wide area of the upper side of the obstacle 804, and then cleans the narrow area between the left side of the obstacle 804 and the wall, the cleaning robot 1 may have to pass through the 'already cleaned area'.

For example, when the cleaning robot 1 has to pass through the 'already cleaned area' between the positions D and E of FIG. 8D, the cleaning robot 1 may have to move along a route designated by a thick arrow between the positions D and E as shown in FIG. 8E. At this time, the control unit 11 of the cleaning robot 1 may analyze the route between the positions D and E, and may determine whether to switch the operation mode into the moving mode or the cleaning mode, while passing through the route between the positions D and E (912 of FIG. 9). That is, the control unit 11 may determine whether a time required to pass through the route between the positions D and E exceeds a preset time t1, or a moving distance of the route between the positions D and E exceeds a preset distance d1 (914 of FIG. 9). Since the cleaning robot 1 has already performed the cleaning operation of the area between the positions C and D, and thus knows a distance between the positions C and D, it may be possible to calculate the required time and the moving distance from the position D to the position E via the position C. If the time required to pass through the route between the positions D and E exceeds the preset time t1, or the moving distance of the route between the positions D and E exceeds the preset distance d1, or both of the two conditions are satisfied ('Yes' of 914 of FIG. 9), the control unit 11 may convert the operation mode of the cleaning robot 1 from the cleaning mode into the moving mode, and then may move from the position D to the position E (916 of FIG. 9). The cleaning robot 1 which has moved to the position E may convert again the operation mode from the moving mode to the cleaning mode, and then may perform the cleaning operation of the remaining area of the upper side of the obstacle 804 (918 of FIG. 9). On the contrary, if the time required to pass through the route between the positions D and E is less than the preset time t1, or the moving distance of the route between the positions D and E is less than the preset distance d1, or both of the two conditions are not satisfied ('No' of 914 of FIG. 9), the control unit 11 may maintain the operation mode of the cleaning robot 1 in the cleaning mode, and the cleaning robot 1 may move from the position D to the position E (920 of FIG. 9). The cleaning robot 1 which has moved to the position E may perform the cleaning operation of the remaining area of the upper side of the obstacle 804 (922 of FIG. 9). In FIGS. 8A to 8F and 9, when the cleaning robot 1 is in the inspecting mode, not the cleaning mode, or the cleaning robot 1 passes through the already cleaned area, like the route between the positions D and E, again, the control unit 11 of the cleaning robot 1 according to one or more embodiments may control the cleaning robot 1 to move in a state in which the air blowing unit 202 and the roller 31a used for the cleaning operation are stopped, thereby possibly saving the power consumption of the battery 50. The air blowing unit 202 generating a strong sucking force at the cleaning robot 1 may have to rotate at a high speed, and thus the high power consumption may be required. Therefore, if the operation of the air blowing unit 202 is stopped, the power consumption may be considerably reduced. Therefore, when the cleaning robot 1 passes through the already cleaned area, again, like the route between the positions D and E, the cleaning robot 1 may be controlled to move in the state in which the air blowing unit 202 used for the cleaning operation is stopped, and thus the power consumption may be considerably reduced. Furthermore, if the operation of the roller 31a which is used for the cleaning operation is also stopped, the power saving effect may be more enhanced.

However, in the case in which the cleaning robot 1 converts the operation mode into the moving mode and then moves the route between the positions D and E only when the time required to pass through the route between the positions D and E exceeds the preset time t1, or the moving distance of the route between the positions D and E exceeds the preset distance d1, or both of the two conditions are satisfied, like the operations 916 and 918 of FIG. 9, if the route between the positions D and E is too short, the power consumption due to re-operation of the motors when the air blowing unit 202, the roller 31a, and the like are stopped and then re-operated may be greater than the power saving effect obtained when the cleaning robot 1 converts the operation mode from the cleaning mode into the moving mode and then moves. As a result, the power saving effect may not be expected. Therefore, the cleaning robot 1 may convert the operation mode into the moving mode and then may move, only when the power saving effect may be expected in consideration of the moving distance or time along the route between the positions D and E.

<Third Embodiment: Returning Mode>

Figure 10A:
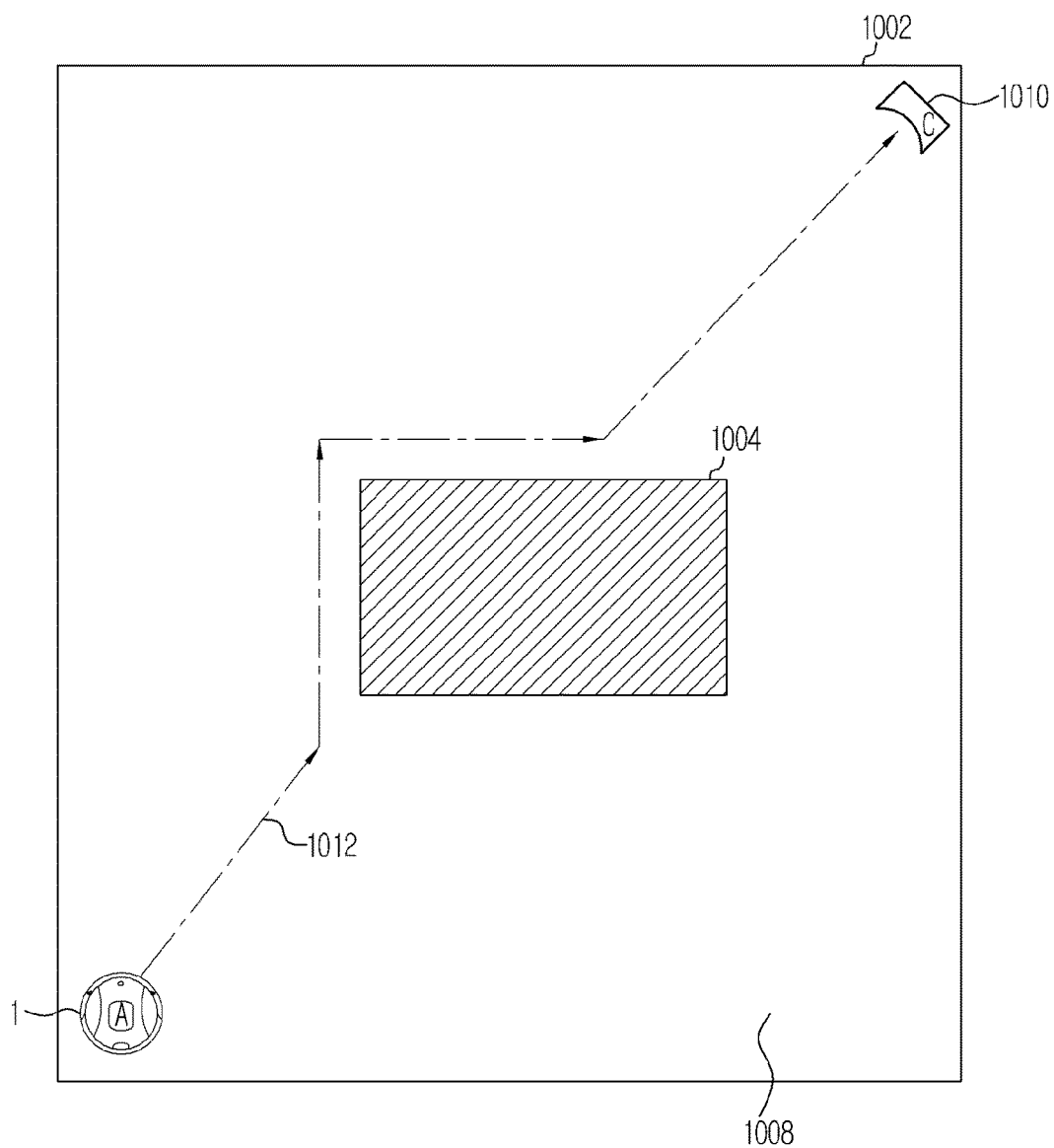
FIGS. 10A to 10B are views respectively illustrating a movement trajectory of a cleaning robot in accordance with one or more embodiments.
Figure 10B:
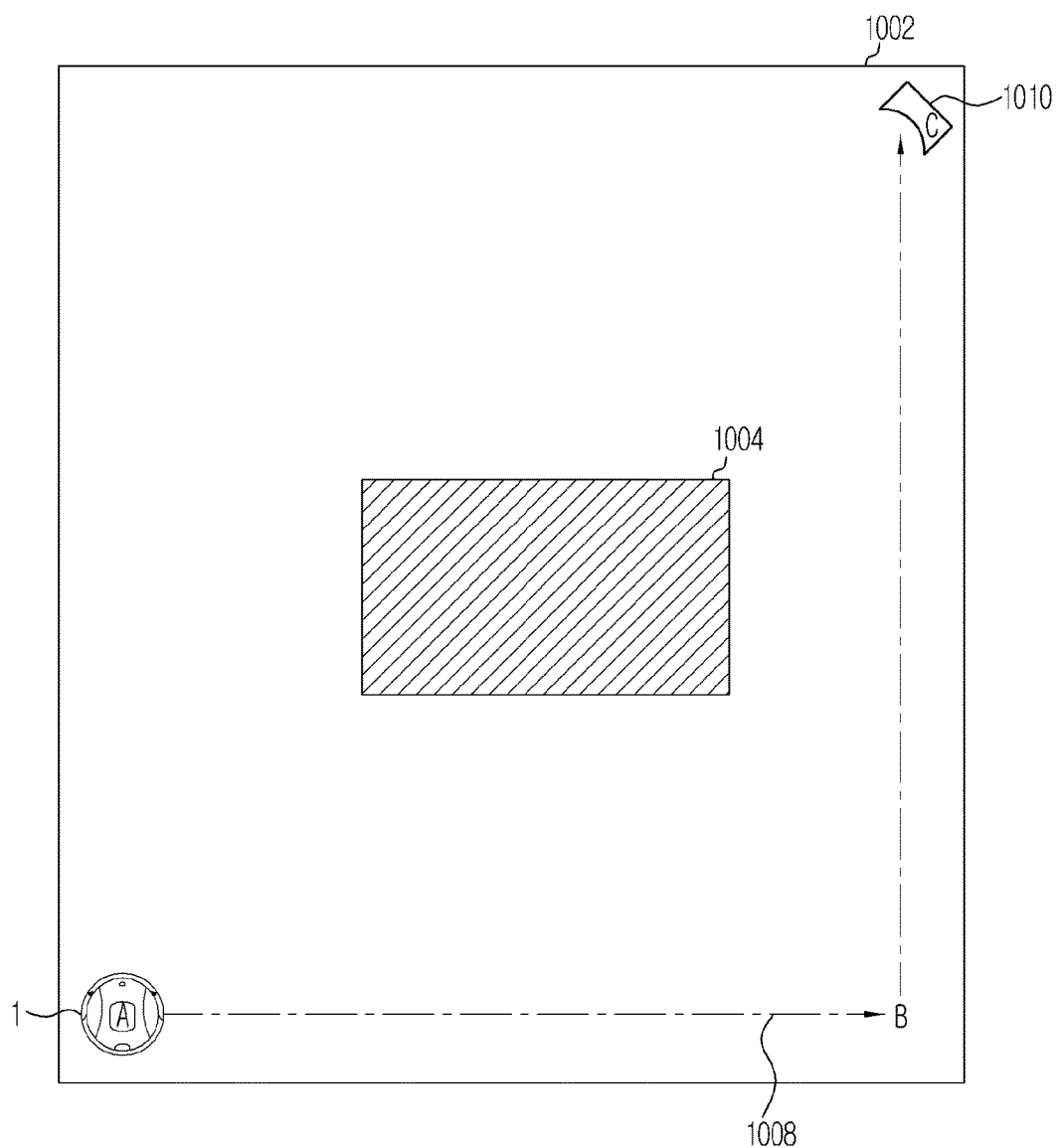
Figure 11:
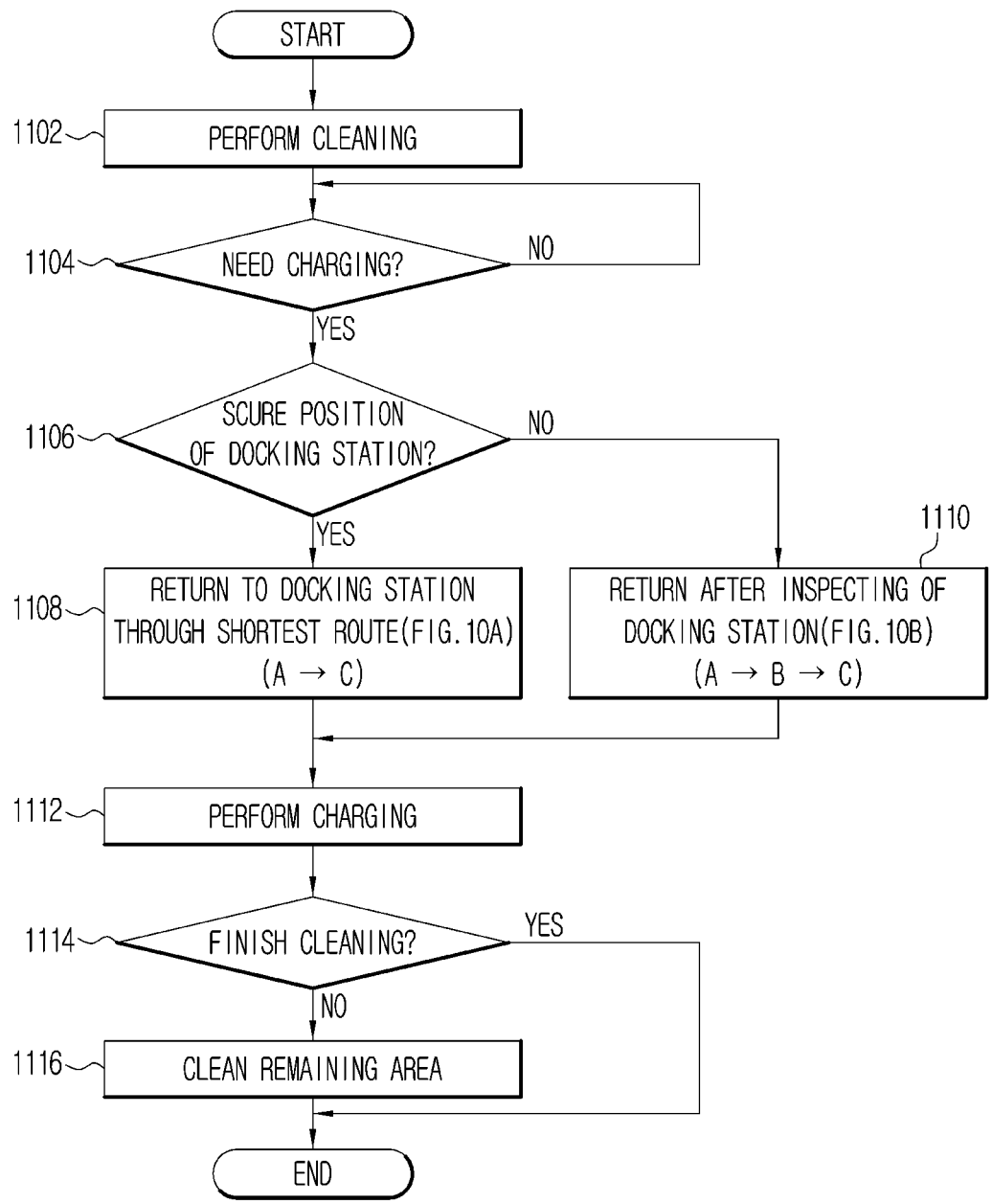
FIG. 11 is a flowchart of a control method of a cleaning robot in accordance with one or more embodiments.

FIGS. 10A, 10B, and 11 are views respectively illustrating a control method of a cleaning robot in accordance with one or more embodiments, wherein FIGS. 10A to 10B are views respectively illustrating a movement trajectory of a cleaning robot in accordance with one or more embodiments, and FIG. 11 is a flowchart of a control method of a cleaning robot in accordance with one or more embodiments. A method of controlling a cleaning robot in accordance with one or more embodiments will be described with reference to FIGS. 10A, 10B, and 11.

First, the cleaning robot 1 may perform the cleaning operation (1102 of FIG. 11). Here, the 'performance of the cleaning operation' may include all of a state immediately after starting of the cleaning operation, a state in the midst of the cleaning operation, and a state immediately after finishing of the cleaning operation. If it is determined that the battery 50 needs to be charged in one of the state immediately after starting of the cleaning operation, the state in the midst of the cleaning operation, and the state immediately after finishing of the cleaning operation ('Yes' of 1104 of FIG. 11), the control unit 11 may convert the operation mode of the cleaning robot 1 into a returning mode, and then may check whether a position of the docking station 102 is secured (1106 of FIG. 11). If it is determined that the battery 50 does not need to be charged ('No' of 1104 of FIG. 11), the control unit 11 may maintain one of the state immediately after starting of the cleaning operation, the state in the midst of the cleaning operation, and the state immediately after finishing of the cleaning operation.

If the position of the docking station 102 is already secured ('Yes' of 1106 of FIG. 11), a shortest route may be calculated in consideration of a distance and direction from a current position of the cleaning robot 1 to the docking station 102, as illustrated in FIG. 10A, and then the cleaning robot 1 may return to the docking station 102 along the calculated shortest route (1108 of FIG. 11). The control unit 11 may control the cleaning robot 1 to move in the state in which the air blowing unit 202 and the roller 31a used for the cleaning operation are stopped, thereby possibly saving the power consumption of the battery 50 while the cleaning robot 1 returns.

The cleaning robot 1 which has returned to the docking station 102 may receive power from the docking station 102 and thus may perform the charging operation (1112 of FIG. 11). If an operation state of the cleaning robot 1 before returning to the docking station 102 is the state immediately after starting of the cleaning operation or the state in the midst of the cleaning operation, the cleaning operation may not yet be finished ('No' of 1114 of FIG. 11), and thus the cleaning operation of a remaining cleaning area 1002 may be performed after the charging operation (1116 of FIG. 11).

In the operation 1106 of FIG. 11, if the position of the docking station 102 is not secured ('No' of 1106 of FIG. 11), the position of the docking station 102 may be checked by the inspection of the cleaning area 1002 in order to secure the position of the docking station 102 from the current position of the cleaning robot 1, as illustrated in FIG. 10B, and then the cleaning robot 1 may return to the docking station 102 (1110 of FIG. 11). As described above, the control unit 11 may control the cleaning robot 1 to move in the state in which the air blowing unit 202 and the roller 31a used for the cleaning operation are stopped, thereby possibly saving the power consumption of the battery 50 while the cleaning robot 1 returns to the docking station 102 after the inspection of the position of the docking station 102.

The cleaning robot 1 which has returned to the docking station 102 may receive power from the docking station 102 and may perform the charging operation (1112 of FIG. 11). If the operation state of the cleaning robot 1 before the return to the docking station 102 is the state immediately after starting of the cleaning operation or the state in the midst of the cleaning operation, the cleaning operation may not yet be finished ('No' of 1114 of FIG. 11), and thus the cleaning operation of the remaining cleaning area 1002 may be performed after the charging operation (1116 of FIG. 11).

In FIGS. 10a, 10B, and 11, when the cleaning robot 1 returns to the docking station 102 through the shortest route return or the return after the inspection in order to perform the charging operation, the control unit 11 of the cleaning robot 1 according to one or more embodiments may control the cleaning robot 1 to move in the state in which the air blowing unit 202 and the roller 31a used for the cleaning operation are stopped, thereby possibly saving the power consumption of the battery 50.

The air blowing unit 202 generating a strong sucking force at the cleaning robot 1 may have to rotate at a high speed, and thus the high power consumption may be required. Therefore, if the operation of the air blowing unit 202 is stopped, the power consumption may be considerably reduced. Therefore, when the cleaning robot 1 returns to the docking station 102, the cleaning robot 1 may be controlled to move in the state in which the air blowing unit 202 necessary for the cleaning operation is stopped, and thus the power consumption may be considerably reduced. Furthermore, if the operation of the roller 31a which is used for the cleaning operation may also be stopped, the power saving effect may be more enhanced.

According to one or more embodiments, it may be possible to enhance cleaning efficiency by using the high-voltage power upon the operation of the cleaning unit, and also to improve power consumption efficiency by using the low-voltage power upon the moving or inspecting operation.

Further, It may be possible to perform the moving or inspecting operation while the operation of the cleaning unit is stopped in a case in which the operation of the cleaning unit is not needed, and thus to possibly enhance the power consumption efficiency.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A cleaning robot comprising:
a battery;
a moving unit that is drivable to move the cleaning robot;
a cleaning unit that is drivable to perform a cleaning operation;
a power converter to convert and output power supplied from the battery into a first power to drive the moving unit and a second power to drive the cleaning unit; and
a controller configured to:
supply the first power to the moving unit so as to drive the moving unit to move the cleaning robot,
supply the second power to the cleaning unit so as to perform the cleaning operation, and
when determined by the controller that the cleaning robot will move through an already cleaned areas of the cleaning area, determine whether to interrupt the supplied second power while passing through the already cleaned area and then re-supply the second power based on at least one of a time of travel of the cleaning robot and a distance of travel of the cleaning robot necessary to pass through the already cleaned area,
wherein the controller either interrupts or maintains the second power being supplied to the cleaning unit according to the determination to optimize power saving during operation.

2. The cleaning robot according to claim 1, wherein the controller interrupts the second power being supplied to the cleaning unit, in response to the moving distance on an already cleaned area exceeding a reference distance.

3. The cleaning robot according to claim 2, wherein the controller interrupts the second power being supplied to the cleaning unit, when a time required to move on the already cleaned area exceeds a reference time.

4. The cleaning robot according to claim 1, wherein:
the first power is power having a first voltage and the second power is power having a second voltage; and
a level of the second voltage is higher than a level of the first voltage.

5. The cleaning robot according to claim 1, wherein the cleaning unit comprises an air blowing unit in which a fan is rotated by a motor so as to generate a sucking force.

6. The cleaning robot according to claim 1, wherein the power converter converts and outputs the power supplied from the battery into third power having a third voltage for powering the controller.

7. A method of controlling a cleaning robot, comprising:
receiving power having a first voltage from a battery, driving a moving unit using the first voltage, and moving on a cleaning area;
receiving power having a second voltage, which is higher than the first voltage, from the battery, driving a cleaning unit using the second voltage, and performing a cleaning operation on the cleaning area;
when determined by the controller that the cleaning robot will move through an already cleaned areas of the cleaning area, determining whether to interrupt the second voltage while passing through the already cleaned area and then re-supply the second voltage, based on at least one of a time of travel of the cleaning robot and a distance of travel of the cleaning robot necessary to pass through the already cleaned area; and
either maintaining or stopping the cleaning operation based on the determination to optimize power saving during operation.

8. The method according to claim 7, wherein the stopping of the cleaning operation is performed when a moving distance on the already cleaned area exceeds a preset distance in a case in which the cleaning robot moves on the already cleaned area.

9. The method according to claim 7, wherein the stopping of the cleaning operation is performed when an estimated moving time on the already cleaned area exceeds a preset time in a case in which the cleaning robot moves on the already cleaned area.

10. A robot comprising:
a moving unit that is drivable to move the robot;
a cleaning unit that is drivable to perform a cleaning operation; and
a controller to:
supply a first power to the moving unit to thereby drive the moving unit to move the robot,
supply a second power to the cleaning unit to thereby drive the cleaning unit to clean a surface while the robot is being moved by the moving unit,
while the robot is cleaning the surface, when determined by the controller that the cleaning robot will move through an already cleaned areas of the cleaning area, determine whether to interrupt the supplied second power while passing through the already cleaned area and then re-supply the second power based on at least one of a time of travel and a distance of travel of the robot necessary to pass through the already cleaned area,
wherein the controller either interrupts or maintains the supply of the second power to the cleaning unit while continuing to supply the first power to the moving unit so that the robot continues to be moved by the moving unit with the cleaning by the cleaning unit being either maintained or stopped to optimize power saving during operation.

* * * * *